(12) United States Patent
Abdelghaffar et al.

(10) Patent No.: US 12,556,223 B2
(45) Date of Patent: Feb. 17, 2026

(54) TECHNIQUES FOR PARTIAL FREQUENCY SOUNDING WITH FREQUENCY HOPPING

(71) Applicant: QUALCOMM INCORPORATED, San Diego, CA (US)

(72) Inventors: Muhammad Sayed Khairy Abdelghaffar, San Jose, CA (US); Alexandros Manolakos, Escondido, CA (US); Ahmed Elshafie, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 18/262,253

(22) PCT Filed: Mar. 30, 2022

(86) PCT No.: PCT/CN2022/083922
§ 371 (c)(1),
(2) Date: Jul. 20, 2023

(87) PCT Pub. No.: WO2022/206798
PCT Pub. Date: Oct. 6, 2022

(65) Prior Publication Data
US 2024/0120963 A1    Apr. 11, 2024

(30) Foreign Application Priority Data

Mar. 31, 2021  (WO) ................ PCT/CN2021/084480

(51) Int. Cl.
*H04B 1/00* (2006.01)
*H04B 1/7143* (2011.01)
*H04L 5/00* (2006.01)

(52) U.S. Cl.
CPC ......... *H04B 1/7143* (2013.01); *H04L 5/0012* (2013.01); *H04L 5/0094* (2013.01)

(58) Field of Classification Search
CPC .... H04B 1/7143; H04L 5/0012; H04L 5/0094
(Continued)

(56) References Cited

U.S. PATENT DOCUMENTS

2012/0113967 A1  5/2012  Smith et al.
2019/0372805 A1  12/2019  Tang
(Continued)

FOREIGN PATENT DOCUMENTS

CN   102378383 A   3/2012
CN   103354661 A   10/2013
(Continued)

OTHER PUBLICATIONS

International Search Report and Written Opinion—PCT/CN2021/084480—ISA/EPO—Dec. 22, 2021.
(Continued)

*Primary Examiner* — Zewdu A Kassa
(74) *Attorney, Agent, or Firm* — QUALCOMM Incorporated

(57) ABSTRACT

Methods, systems, and devices for wireless communications are described. In a wireless communications system, a user equipment (UE) may use partial frequency sounding with different frequency subhop patterns so that a portion (which may be referred to as a subhop) of configured sounding reference signal (SRS) resources (e.g., a hop) are sounded. In some cases, a UE may receive a control message from a network entity identifying the frequency subhop pattern. In some cases, the network entity may configure a UE to transmit repetitions of the SRS in a same hop across consecutive symbols to increase a probability that the transmissions are successfully received and decoded by the network
(Continued)

entity. As such, the network entity may configure a repetition factor for the frequency subhop pattern. In some cases, the frequency subhop pattern may introduce a frequency overlap between subhops.

30 Claims, 20 Drawing Sheets

(58) Field of Classification Search
USPC .................. 375/133, 130, 219, 295, 316
See application file for complete search history.

(56) References Cited

U.S. PATENT DOCUMENTS

2020/0107304 A1* 4/2020 Wang .................. H04L 5/0005
2020/0350970 A1* 11/2020 Liu ..................... H04L 5/0048

FOREIGN PATENT DOCUMENTS

| CN | 110178434 A | 8/2019 |
| CN | 110741592 A | 1/2020 |
| CN | 111865545 A | 10/2020 |
| JP | 2013540396 A | 10/2013 |
| WO | WO-2018132945 A1 | 7/2018 |
| WO | WO-2018226411 A1 | 12/2018 |
| WO | WO-2020197335 A1 | 10/2020 |

OTHER PUBLICATIONS

International Search Report and Written Opinion—PCT/CN2022/083922—ISA/EPO—Jun. 28, 2022.
Samsung: "SRS Transmission for Wider Bandwidth," 3GPP TSG RAN WG1 Meeting #90, Prague, Czech Republic Aug. 21-25, 2017, (Aug. 25, 2017), R1-1714530, 2 pages, section 2.

* cited by examiner

TECHNIQUES FOR PARTIAL FREQUENCY SOUNDING WITH FREQUENCY HOPPING

CROSS REFERENCES

The present Application is a 371 national stage filing of International Patent Application No. PCT/CN2022/083922 by Abdelghaffar et al. entitled "TECHNIQUES FOR PARTIAL FREQUENCY SOUNDING WITH FREQUENCY HOPPING," filed Mar. 30, 2022, and claims priority to International PCT Application No. PCT/CN2021/084480 by Abdelghaffar et al. entitled "TECHNIQUES FOR PARTIAL FREQUENCY SOUNDING WITH FREQUENCY HOPPING," filed Mar. 31, 2021, each of which is assigned to the assignee hereof, and each of which is expressly incorporated by reference in its entirety herein.

FIELD OF TECHNOLOGY

The following relates to wireless communications, including techniques for partial frequency sounding with frequency hopping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

In some wireless communications systems, a UE may be configured to transmit reference signals for sounding resources. But in some situations, existing sounding techniques may be deficient.

SUMMARY

The described techniques relate to improved methods, systems, devices, and apparatuses that support techniques for partial frequency sounding with frequency hopping. Generally, the described techniques provide for enabling a user equipment (UE) to use partial frequency sounding with different frequency subhop patterns so that a portion (which may be referred to as a "subhop") of the configured sounding reference signal (SRS) resources (e.g., a hop) are sounded. In some cases, a UE may receive a control message from a network entity identifying the frequency subhop pattern. In some cases, the network entity may configure a UE to transmit repetitions of the SRS in a same hop across consecutive symbols to increase a probability that the transmissions are successfully received and decoded by the network entity. As such, the network entity may configure a repetition factor for the frequency subhop pattern. In some cases, the frequency subhop pattern may introduce a frequency overlap between subhops.

A method for wireless communication at a UE is described. The method may include transmitting an indication of a capability of the UE to use partial frequency sounding with frequency hopping, receiving, based on transmitting the indication, a control message identifying a frequency subhop pattern for application to transmission by the UE of an SRS, and transmitting the SRS in a selected frequency subhop in each frequency hop of a set of frequency hops based on the frequency subhop pattern.

An apparatus for wireless communication at a UE is described. The apparatus may include a processor, memory coupled with the processor, and instructions stored in the memory. The instructions may be executable by the processor to cause the apparatus to transmit an indication of a capability of the UE to use partial frequency sounding with frequency hopping, receive, based on transmitting the indication, a control message identifying a frequency subhop pattern for application to transmission by the UE of an SRS, and transmit the SRS in a selected frequency subhop in each frequency hop of a set of frequency hops based on the frequency subhop pattern.

Another apparatus for wireless communication at a UE is described. The apparatus may include means for transmitting an indication of a capability of the UE to use partial frequency sounding with frequency hopping, means for receiving, based on transmitting the indication, a control message identifying a frequency subhop pattern for application to transmission by the UE of an SRS, and means for transmitting the SRS in a selected frequency subhop in each frequency hop of a set of frequency hops based on the frequency subhop pattern.

A non-transitory computer-readable medium storing code for wireless communication at a UE is described. The code may include instructions executable by a processor to transmit an indication of a capability of the UE to use partial frequency sounding with frequency hopping, receive, based on transmitting the indication, a control message identifying a frequency subhop pattern for application to transmission by the UE of an SRS, and transmit the SRS in a selected frequency subhop in each frequency hop of a set of frequency hops based on the frequency subhop pattern.

Some examples of the method, apparatuses, and non-transitory computer-readable medium described herein may further include operations, features, means, or instructions for receiving a radio resource control (RRC) message identifying that partial frequency sounding may be activated, where the control message identifying the frequency subhop pattern may be received based on receiving the RRC message.

In some examples of the method, apparatuses, and non-transitory computer-readable medium described herein, the RRC message identifies one or more frequency subhop patterns, the one or more frequency subhop patterns including the frequency subhop pattern identified in the control message.

In some examples of the method, apparatuses, and non-transitory computer-readable medium described herein, the RRC message further identifies a scheduling configuration for the SRS, and the frequency subhop pattern identified in the control message may be based on the identified scheduling configuration.

In some examples of the method, apparatuses, and non-transitory computer-readable medium described herein, the identified scheduling configuration includes an aperiodic configuration, a semi-persistent configuration, or a periodic configuration.

In some examples of the method, apparatuses, and non-transitory computer-readable medium described herein, the control message identifies a starting subhop index for the frequency subhop pattern.

In some examples of the method, apparatuses, and non-transitory computer-readable medium described herein, receiving the control message identifying the frequency subhop pattern may include operations, features, means, or instructions for receiving a medium access control (MAC) control element (MAC-CE) identifying the frequency subhop pattern and that partial frequency sounding may be activated, where the MAC-CE includes the control message.

In some examples of the method, apparatuses, and non-transitory computer-readable medium described herein, a first bit of the MAC-CE identifies that partial frequency sounding may be activated, and a second bit the MAC-CE identifies the frequency subhop pattern.

In some examples of the method, apparatuses, and non-transitory computer-readable medium described herein, a set of bits of the message in the MAC-CE identifies the frequency subhop pattern and that partial frequency sounding may be activated.

In some examples of the method, apparatuses, and non-transitory computer-readable medium described herein, receiving the control message identifying the frequency subhop pattern may include operations, features, means, or instructions for receiving a downlink control information (DCI) message identifying the frequency subhop pattern and that partial frequency sounding may be activated, where the DCI message includes the control message.

In some examples of the method, apparatuses, and non-transitory computer-readable medium described herein, transmitting the SRS in the selected frequency subhop in each frequency hop may include operations, features, means, or instructions for transmitting the SRS using a first same frequency subhop in each frequency hop within a first slot and a second same frequency subhop in each frequency hop within a second slot, the first same frequency subhop and the second same frequency subhop corresponding to the selected frequency subhop.

In some examples of the method, apparatuses, and non-transitory computer-readable medium described herein, transmitting the SRS in the selected frequency subhop in each frequency hop may include operations, features, means, or instructions for transmitting the SRS using a same frequency subhop in each frequency hop, the same frequency subhop corresponding to the selected frequency subhop.

In some examples of the method, apparatuses, and non-transitory computer-readable medium described herein, transmitting the SRS in the selected frequency subhop in each frequency hop may include operations, features, means, or instructions for transmitting the SRS using a first cyclic frequency subhop in each frequency hop within a first slot or a first symbol and a second cyclic frequency subhop in each frequency hop within a second slot or a second symbol, the first cyclic frequency subhop and the second cyclic frequency subhop corresponding to the selected frequency subhop.

In some examples of the method, apparatuses, and non-transitory computer-readable medium described herein, transmitting the SRS in the selected frequency subhop in each frequency hop may include operations, features, means, or instructions for transmitting the SRS using a first frequency subhop in a first frequency hop and a second frequency subhop in a second frequency hop, the first frequency subhop and the second frequency subhop corresponding to the selected frequency subhop, where the first frequency subhop and the second frequency subhop may be determined in accordance with a bit-reversal representation based on a first quantity of frequency subhops across a second quantity of frequency hops.

In some examples of the method, apparatuses, and non-transitory computer-readable medium described herein, transmitting the SRS in the selected frequency subhop in each frequency hop may include operations, features, means, or instructions for transmitting the SRS using a first frequency subhop with a value zero in a first frequency hop and a second frequency subhop with a value two in a second frequency hop, the first frequency subhop and the second frequency subhop corresponding to the selected frequency subhop, where the first frequency subhop and the second frequency subhop are determined in accordance with a bit-reversal representation based on each of the first frequency hop and the second frequency hop comprising four frequency subhops.

In some examples of the method, apparatuses, and non-transitory computer-readable medium described herein, transmitting the SRS in the selected frequency subhop in each frequency hop may include operations, features, means, or instructions for transmitting the SRS using a first frequency subhop in a first frequency hop and a second frequency subhop in a second frequency hop, the first frequency subhop and the second frequency subhop corresponding to the selected frequency subhop, where the first frequency subhop and the second frequency subhop may be determined in accordance with a function that may be based on a symbol count and a partial frequency sounding configuration.

In some examples of the method, apparatuses, and non-transitory computer-readable medium described herein, transmitting the SRS in the selected frequency subhop in each frequency hop may include operations, features, means, or instructions for transmitting the SRS using a first frequency subhop for a first frequency hop and a second frequency subhop for a second frequency hop, the first frequency subhop and the second frequency subhop corresponding to the selected frequency subhop, where the first frequency subhop and the second frequency subhop may be determined in accordance with a randomization procedure that may be based on an identifier associated with the UE and a partial frequency sounding configuration.

In some examples of the method, apparatuses, and non-transitory computer-readable medium described herein, transmitting the SRS in the selected frequency subhop in each frequency hop may include operations, features, means, or instructions for transmitting the SRS using a frequency subhop in a frequency hop, the frequency subhop corresponding to the selected frequency subhop, where the frequency subhop may be determined in accordance with a repetition of the frequency subhop pattern.

In some examples of the method, apparatuses, and non-transitory computer-readable medium described herein, transmitting the SRS in the selected frequency subhop in each frequency hop may include operations, features, means, or instructions for transmitting the SRS using a same frequency subhop in a first frequency hop and a second frequency hop, the same frequency subhop corresponding to the selected frequency subhop, where the same frequency subhop may be determined in accordance with a configured repetition factor.

In some examples of the method, apparatuses, and non-transitory computer-readable medium described herein, transmitting the SRS in the selected frequency subhop in each frequency hop may include operations, features, means, or instructions for transmitting the SRS using a first frequency subhop in a first frequency hop and a second frequency subhop in a second frequency hop, the first frequency subhop and the second frequency subhop corresponding to the selected frequency subhop, where the first frequency subhop and the second frequency subhop may be determined in accordance with a configured repetition factor.

Some examples of the method, apparatuses, and non-transitory computer-readable medium described herein may further include operations, features, means, or instructions for receiving a configuration message identifying a frequency overlap configuration associated with frequency subhops in each frequency hop of the set of frequency hops, where transmitting the SRS in the selected frequency subhop may be further based on the frequency overlap configuration.

A method for wireless communication at a network entity is described. The method may include receiving an indication of a capability of a UE to use partial frequency sounding with frequency hopping, transmitting, based on receiving the indication, a control message identifying a frequency subhop pattern for application to transmission by the UE of an SRS, and receiving the SRS in a selected frequency subhop in each frequency hop of a set of frequency hops based on the frequency subhop pattern.

An apparatus for wireless communication at a network entity is described. The apparatus may include a processor, memory coupled with the processor, and instructions stored in the memory. The instructions may be executable by the processor to cause the apparatus to receive an indication of a capability of a UE to use partial frequency sounding with frequency hopping, transmit, based on receiving the indication, a control message identifying a frequency subhop pattern for application to transmission by the UE of an SRS, and receive the SRS in a selected frequency subhop in each frequency hop of a set of frequency hops based on the frequency subhop pattern.

Another apparatus for wireless communication at a network entity is described. The apparatus may include means for receiving an indication of a capability of a UE to use partial frequency sounding with frequency hopping, means for transmitting, based on receiving the indication, a control message identifying a frequency subhop pattern for application to transmission by the UE of an SRS, and means for receiving the SRS in a selected frequency subhop in each frequency hop of a set of frequency hops based on the frequency subhop pattern.

A non-transitory computer-readable medium storing code for wireless communication at a network entity is described. The code may include instructions executable by a processor to receive an indication of a capability of a UE to use partial frequency sounding with frequency hopping, transmit, based on receiving the indication, a control message identifying a frequency subhop pattern for application to transmission by the UE of an SRS, and receive the SRS in a selected frequency subhop in each frequency hop of a set of frequency hops based on the frequency subhop pattern.

Some examples of the method, apparatuses, and non-transitory computer-readable medium described herein may further include operations, features, means, or instructions for transmitting an RRC message identifying that partial frequency sounding may be activated, where the control message identifying the frequency subhop pattern may be transmitted based on transmitting the RRC message.

In some examples of the method, apparatuses, and non-transitory computer-readable medium described herein, the RRC message identifies one or more frequency subhop patterns, the one or more frequency subhop patterns including the frequency subhop pattern identified in the control message.

In some examples of the method, apparatuses, and non-transitory computer-readable medium described herein, the RRC message further identifies a scheduling configuration for the SRS, and the frequency subhop pattern identified in the control message may be based on the identified scheduling configuration.

In some examples of the method, apparatuses, and non-transitory computer-readable medium described herein, the identified scheduling configuration includes an aperiodic configuration, a semi-persistent configuration, or a periodic configuration.

In some examples of the method, apparatuses, and non-transitory computer-readable medium described herein, the control message identifies a starting subhop index for the frequency subhop pattern.

In some examples of the method, apparatuses, and non-transitory computer-readable medium described herein, transmitting the control message identifying the frequency subhop pattern may include operations, features, means, or instructions for transmitting a MAC-CE identifying the frequency subhop pattern and that partial frequency sounding may be activated, where the MAC-CE includes the control message.

In some examples of the method, apparatuses, and non-transitory computer-readable medium described herein, a first bit of the MAC-CE identifies that partial frequency sounding may be activated, and a second bit the MAC-CE identifies the frequency subhop pattern.

In some examples of the method, apparatuses, and non-transitory computer-readable medium described herein, a set of bits of the message in the MAC-CE identifies the frequency subhop pattern and that partial frequency sounding may be activated.

In some examples of the method, apparatuses, and non-transitory computer-readable medium described herein, transmitting the control message identifying the frequency subhop pattern may include operations, features, means, or instructions for transmitting a DCI message identifying the frequency subhop pattern and that partial frequency sounding may be activated, where the DCI message includes the control message.

DETAILED DESCRIPTION

Figure 1:
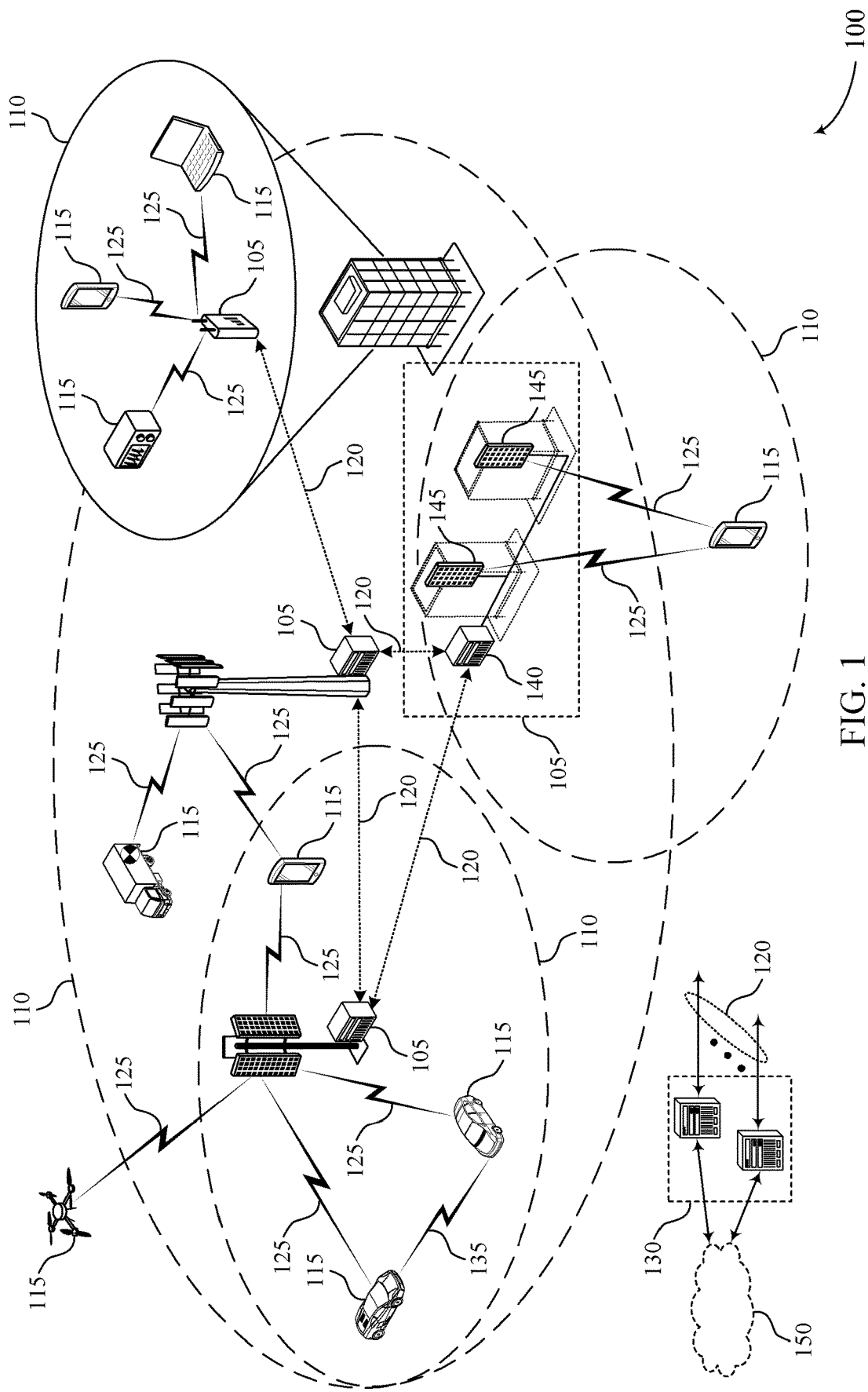
FIGS. 1 and 2 illustrate examples of wireless communications systems that support techniques for partial frequency sounding with frequency hopping in accordance with aspects of the present disclosure.

In some wireless communications systems, a network entity (e.g., a base station) may configure a user equipment (UE) to perform frequency hopping to transmit repetitions of a sounding reference signal (SRS). In some cases, the network entity may configure the UE to determine which frequency hop to use for transmitting the SRS based on a slot index. For example, the UE may determine to use a frequency hop in which one or more symbols of a set of symbols may hop (e.g., change) frequencies. When a UE sounds a full hop, a power spectral density (PSD) may be configured for the corresponding frequency resources. However, sounding a full hop (e.g., sounding the full frequency range of the hop) may result in an inefficient use of power. Further, when each UE sounds a full hop, with each UE using the resources for full sounding, the quantity of UEs which a network entity may configure for sounding in a given set of resources (e.g., via multiplexing) is limited.

Techniques described herein may support partial frequency sounding with frequency hopping. In some cases, a UE may use partial frequency sounding to sound a portion (which may be referred to as a "subhop") of configured SRS resources (e.g., a hop), rather than a full frequency range of the hop. The UE may transmit an SRS in a subhop of a hop according to a frequency subhop pattern. In some cases, the UE may receive a control message from a network entity identifying the frequency subhop pattern. In some cases, the frequency subhop pattern may be fixed across all slots such that the same subhop is sounded across all hops, or the frequency subhop pattern may be fixed per slot. In some cases, the frequency subhop pattern may be cyclical, or may be based on a function or procedure (e.g., randomization). In some cases, the network entity may configure a UE to transmit repetitions of the SRS in a same hop across consecutive symbols to increase a probability that the transmissions are successfully received and decoded by the network entity. As such, the network entity may configure a repetition factor for the frequency subhop pattern. For example, the frequency subhop pattern may be fixed such that the same subhop is repeated across all consecutive symbols. In some cases, the frequency subhop pattern may introduce a frequency overlap between subhops. In some examples, the network entity may configure the frequency subhop pattern (or patterns) via control signaling, such as radio resource control (RRC) signaling, a medium access control (MAC) control element (MAC-CE), or downlink control information (DCI).

Particular aspects of the subject matter described herein may be implemented to realize one or more advantages. The described techniques may support improvements in partial frequency sounding with frequency hopping by reducing signaling overhead and power usage while improving a PSD of SRS resources. Partial frequency sounding may improve coverage while enhancing user experience and increasing the amount of resources available for other purposes (e.g., multiplexing). As such, supported techniques may include improved network operations and, in some examples, may promote network efficiencies, among other benefits.

Aspects of the disclosure are initially described in the context of wireless communications systems. Aspects of the disclosure are then illustrated by and described with reference to frequency subhop patterns and a process flow. Aspects of the disclosure are further illustrated by and described with reference to apparatus diagrams, system diagrams, and flowcharts that relate to techniques for partial frequency sounding with frequency hopping.

FIG. 1 illustrates an example of a wireless communications system 100 that supports techniques for partial frequency sounding with frequency hopping in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link (e.g., in accordance with a midhaul interface protocol) or a fronthaul communication link (e.g., in accordance with a fronthaul interface protocol), or any combination thereof. The backhaul communication links 120, midhaul communication links, or fronthaul communication links may be or include one or more wired links (e.g., an electrical link, an optical fiber link), one or more wireless links (e.g., a radio link, a wireless optical link), among other examples or various combinations thereof.

One or more of the network entities 105 described herein may include or may be referred to as a base station (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station) may be implemented in an aggregated or monolithic base station architecture, or alternatively, in a disaggregated base station architecture. For example, a network entity 105 may include one or more of a central unit (CU), a distributed unit (DU), a radio unit (RU), a Radio Access Network (RAN) Intelligent Controller (RIC) (e.g., a Near-Real Time RIC (Near-RT RIC), a Non-Real Time RIC (Non-RT RIC), a Service Management and Orchestration (SMO) system, or any combination thereof. An RU may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU, a DU, and an RU is flexible and may support different functionalities depending upon which functions (e.g., network layer functions, protocol layer functions, baseband functions, radio frequency functions, and any combinations thereof) are performed at a CU, a DU, or an RU. For example, a functional split of a protocol stack may be employed between a CU and a DU such that the CU may support one or more layers of the protocol stack and the DU may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU may be connected to one or more DUs or RUs, and the one or more DUs or RUs may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU and an RU such that the DU may support one or more layers of the protocol stack and the RU may support one or more different layers of the protocol stack. The DU may support one or multiple different cells (e.g., via one or more RUs). In some cases, a functional split between a CU and a DU, or between a DU and an RU may be within a protocol layer (e.g., some functions for a protocol layer may be performed by one of a CU, a DU, or an RU, while other functions of the protocol layer are performed by a different one of the CU, the DU, or the RU). A CU may be functionally split further into CU control plane (CU-CP) and CU user plane (CU-UP) functions. A CU may be connected to one or more DUs via a midhaul communication link (e.g., F1, F1-c, F1-u), and a DU may be connected to one or more RUs via a fronthaul communication link (e.g., open fronthaul (FH) interface). In some examples, a midhaul communication link or a fronthaul communication link may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes) may be partially controlled by each other. One or more IAB nodes may be referred to as a donor entity or an IAB donor. One or more DUs (e.g., one or more RUs) may be partially controlled by CUs associated with a donor network entity 105 (e.g., a donor base station). The one or more donor network entities 105 (e.g., IAB donors) may be in communication with one or more additional network entities 105 (e.g., IAB nodes) via supported access and backhaul links (e.g., backhaul communication links 120). IAB nodes may include an IAB mobile termination (IAB-MT) controlled (e.g., scheduled) by DUs of a coupled IAB donor. An IAB-MT may include an independent set of antennas for relay of communications with UEs 115, or may share the same antennas (e.g., of an RU) of an IAB node used for access via the DU of the IAB node (e.g., referred to as virtual IAB-MT (vIAB-MT)). In some examples, the IAB nodes may include DUs that support communication links with additional entities (e.g., IAB nodes, UEs 115) within the relay chain or configuration of the access network (e.g., downstream). In such cases, one or more components of the disaggregated RAN architecture (e.g., one or more IAB nodes or components of IAB nodes) may be configured to operate according to the techniques described herein.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, the network entities 105 may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to each other UE 115 in the group. In some examples, a network entity 105 facilitates the scheduling of resources for D2D communications. In other cases, D2D communications are carried out between the UEs 115 without the involvement of a network entity 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a network entity 105 may configure a UE 115 to perform frequency hopping to transmit repetitions of an SRS. In some cases, a configuration of SRS frequency resources may depend on whether frequency hopping is enabled or disabled. The network entity 105 may configure the UE 115 to determine which frequency hop to use for transmitting the SRS based on a slot index. For example, the UE 115 may determine to use a frequency hop in which one or more symbols of a set of symbols may hop (e.g., change) frequencies. In some cases, the network entity 105 may configure frequency hopping of the SRS using the hopping bandwidth parameter $b_{hop} \in \{0, 1, 2, 3\}$, which is given by the corresponding field contained in the higher layer parameter freqHopping. In some cases, if frequency hopping is not enabled, $b_{hop}=0$. If the hopping bandwidth is less than the SRS bandwidth (e.g., if $b_{hop}<B_{SRS}$), then frequency hopping is enabled, and if the hopping bandwidth is greater than or equal to the SRS bandwidth (e.g., if b hop $B_{SRS}$), then frequency hopping is disabled.

In some cases, the UE 115 may use partial frequency sounding with frequency hopping. The UE 115 may use partial frequency sounding with different frequency subhop patterns so that a subhop in each configured hop is sounded. For example, a frequency hop may be divided into four partial frequency bands or ranges, resulting in 4 subhops per hop. In some cases, a UE 115 may receive a control message from a network entity 105 identifying the frequency subhop pattern. In some cases, the frequency subhop pattern may be fixed across all slots such that the same subhop is sounded across all hops, or the frequency subhop pattern may be fixed per slot. In some cases, the frequency subhop pattern may be cyclical, or may be based on a function or procedure (e.g., randomization). In some cases, the network entity 105 may configure a UE 115 to transmit repetitions of the SRS in a same hop across consecutive symbols to increase a probability that the transmissions are successfully received and decoded by the network entity 105. As such, the network entity 105 may configure a repetition factor for the frequency subhop pattern. For example, the frequency subhop pattern may be fixed such that the same subhop is repeated across all consecutive symbols. In some cases, the frequency subhop pattern may introduce a frequency overlap between subhops. In some examples, the frequency subhop pattern (or patterns) may be configured via control signaling, such as RRC signaling, a MAC-CE, or DCI.

Figure 2:
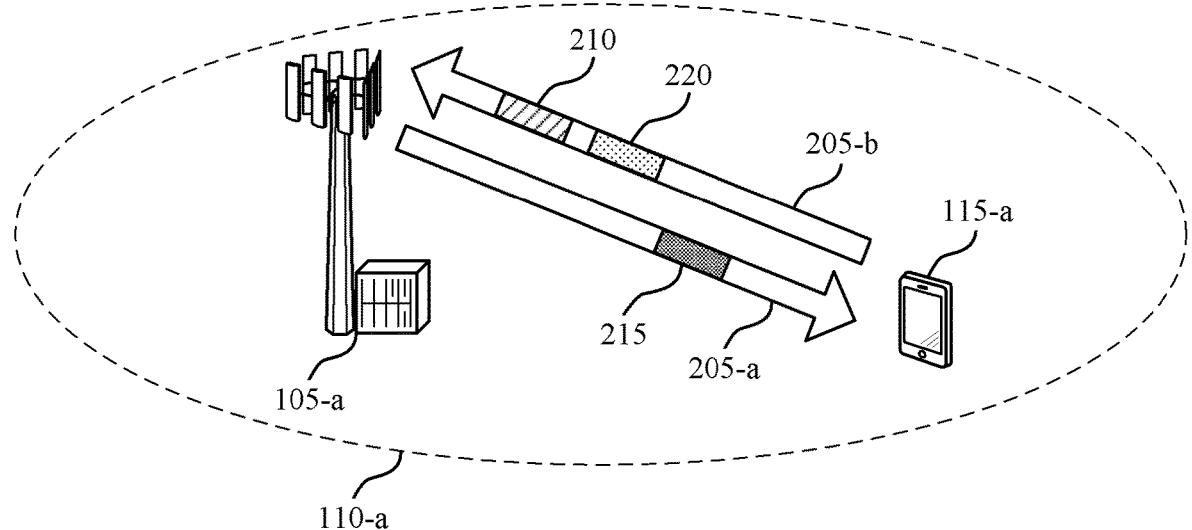

FIG. 2 illustrates an example of a wireless communications system 200 that supports techniques for partial frequency sounding with frequency hopping in accordance with aspects of the present disclosure. In some examples, the wireless communications system 200 may implement or be implemented by aspects of the wireless communications system 100. For example, the wireless communications system 200 may include a network entity 105-a and a UE 115-a, which may be examples of corresponding devices described herein with reference to FIG. 1. In some cases, the network entity 105-a and the UE 115-a may implement a frequency subhop pattern to apply to an uplink transmission (e.g., uplink control or data transmission).

The UE 115-a may communicate with the network entity 105-a in a geographic coverage area 110-a of the network entity 105-a. For example, the network entity 105-a may transmit one or more downlink signals to the UE 115-a via a communications link 205-a (e.g., a downlink communications link) and the UE 115-a may transmit one or more uplink signals to the network entity 105-a via a communications link 205-b (e.g., an uplink communications link). In some cases, the UE 115-a may be configured to transmit uplink signaling (e.g., an SRS 220), and may implement partial frequency sounding using different frequency subhop patterns to apply to each transmission of the SRS 220.

In some cases, the UE 115-a may use different frequency subhop patterns so that a subhop of the configured hop may be sounded. The UE 115-a may transmit a capability indication 210 to the network entity 105-a indicating that the UE 115-a may be capable of using partial frequency sounding with frequency hopping according to a frequency subhop pattern. For example, the UE 115-a may use a frequency hop divided into four partial frequency bands or ranges, resulting in four subhops per hop. In some cases, the capability of the UE 115-a to use a frequency subhop pattern may include dynamic support of frequency subhop pattern activation and deactivation or UE-assisted information indicating the preferred pattern of the UE 115-a. In some cases, the UE 115-a may receive a control message 215 from the network entity 105-a identifying a frequency subhop pattern. In some cases, the frequency subhop pattern may be fixed across all slots such that the same subhop is sounded across all hops, or the frequency subhop pattern may be fixed per slot. In some cases, the frequency subhop pattern may be cyclical, or may be based on a function or procedure (e.g., randomization). In some examples, the control message 215 may identify a starting subhop index (e.g., a starting RB index) for the UE 115-a, where the UE 115-a may sound subhops 505 according to the configured frequency subhop pattern starting with the identified starting subhop index. The network entity 105-a may configure a different starting subhop index for a second UE 115 (not shown), which may reduce a probability of collision between transmissions of the SRS 220 from the UEs 115-a.

In some examples, the network entity 105-a may configure the UE 115-b to transmit repetitions of the SRS 220 in a same hop across consecutive symbols to increase a probability that the transmissions are successfully received and decoded by the network entity 105-a. As such, the control message 215 may configure a repetition factor for the frequency subhop pattern. For example, the frequency subhop pattern may be fixed such that the same subhop is repeated across all consecutive symbols. In some cases, the frequency subhop pattern may introduce a frequency overlap between subhops. In some examples, the network entity 105-a may transmit the control message 215 in RRC signaling, a MAC-CE, or DCI. In some cases, the UE 115-a may transmit the SRS 220 to the network entity 105-a in a selected frequency subhop of the hop, based on the frequency subhop pattern.

Figure 3A:
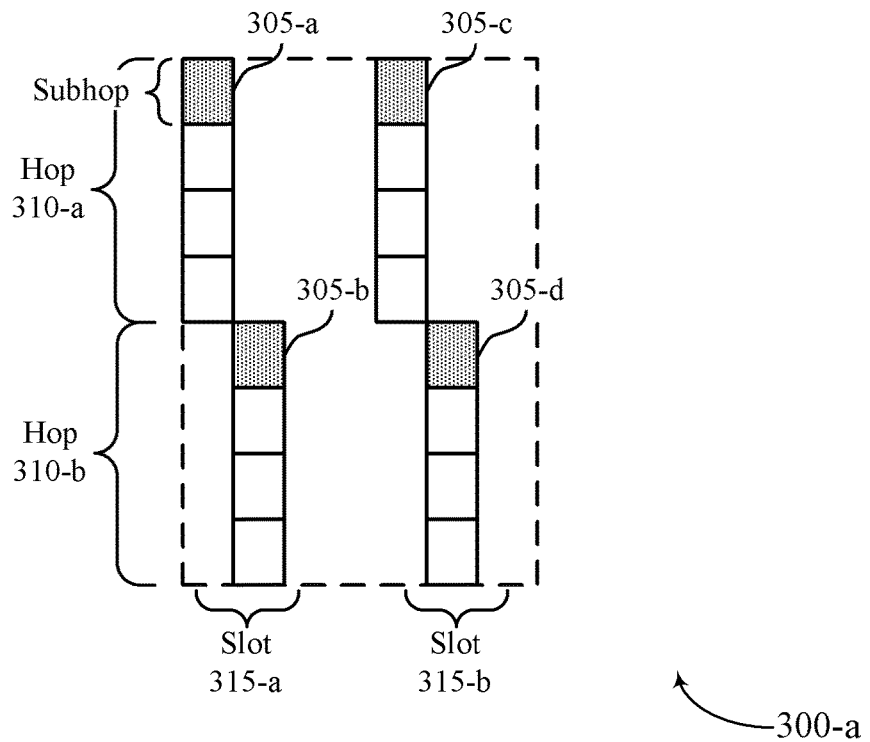
FIGS. 3A and 3B illustrate examples of frequency subhop patterns that support techniques for partial frequency sounding with frequency hopping in accordance with aspects of the present disclosure.
Figure 3B:
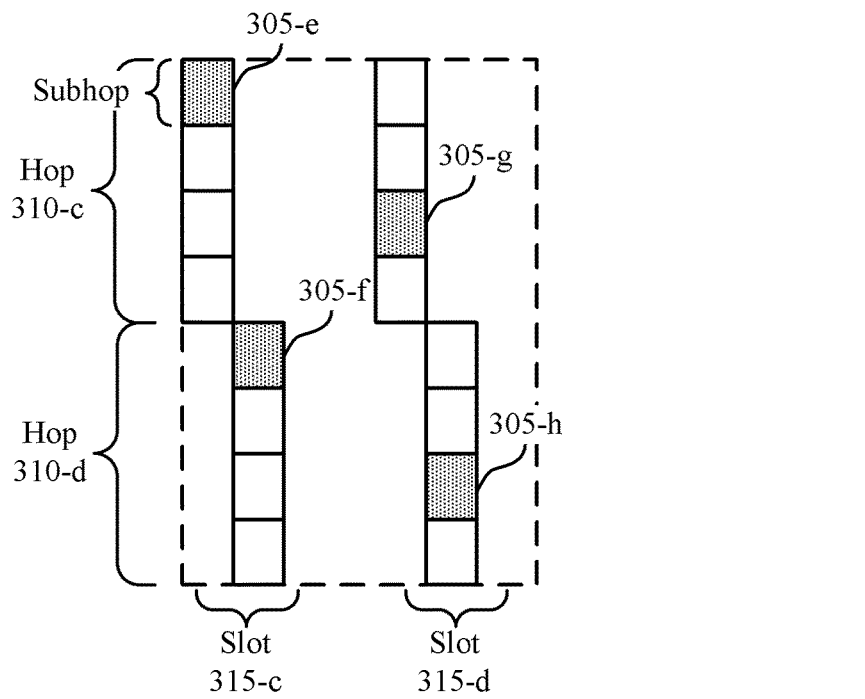

FIGS. 3A and 3B illustrate examples of a frequency subhop pattern 300-a and a frequency subhop pattern 300-b that support techniques for partial frequency sounding with frequency hopping in accordance with aspects of the present disclosure. In some examples, the frequency subhop pattern 300-a and the frequency subhop pattern 300-b may be implemented by aspects of the wireless communications systems 100 and 200. For example, one or more of the frequency subhop pattern 300-a and the frequency subhop pattern 300-b may be implemented by a UE to sound a subhop 305 of a hop 310 in a slot 315, in some cases, as configured by a network entity. The network entity and the UE may be examples of corresponding devices described herein with reference to FIGS. 1 and 2.

As illustrated in FIG. 3A, the frequency subhop pattern 300-a may be a fixed pattern across the slots 315-a and the slot 315-b such that the same subhop 305 (e.g., a subhop 305 with a same index value) is sounded in each hop 310. For example, the network entity may configure a hop 310-a and a hop 310-b each with a quantity of subhops 305 in each slot 315. The hop 310-a may include a subhop 305-a, and the hop 310-b may include a subhop 305-b, where the subhop 305-a and the subhop 305-b may be in a same location within the hops 310-a and 310-b, respectively. That is, the subhop 305-a and the subhop 305-b may each have an index value i, or be the $i^{th}$ subhop 305 in the corresponding hop 310. Accordingly, using a fixed frequency subhop pattern (e.g., the frequency subhop pattern 300-a), the UE may transmit an SRS in subhop 305-a of the hop 310-a and in the subhop 305-b of the hop 310-b in the slot 315-a, where the location of the subhop 305 in which the UE transmits the SRS in each hop 310 may be fixed.

In some examples, the index of the sounded subhop 305 may be fixed across the slot 315-a and the slot 315-b (e.g., all slots). For example, the UE may be configured to transmit an SRS in a subhop 305-c of the hop 310-a and in a subhop 305-d of the hop 310-b in a slot 315-b, where each of the subhops 305-c and 305-d may have the same index value i within the hops 310-a and 310-b, respectively. In some cases, the slot 315-b may be a quantity of slots after the slot 315-a, for example as configured by the network entity.

As illustrated in FIG. 3B, the frequency subhop pattern 300-b may be a fixed pattern on a per-slot basis. For example, the network entity may configure a hop 310-c and a hop 310-d each with a quantity of subhops 305 in each slot 315-c. The hop 310-c may include a subhop 305-e, and the hop 310-d may include a subhop 305-f, where the subhop 305-e and the subhop 305-f may be in a same location within hops 310-c and 310-d, respectively. That is, the subhop 305-e and the subhop 305-f may each have an index value i, or be the $i^{th}$ subhop 305 in the corresponding hop 310. Accordingly, using a fixed frequency subhop pattern (e.g., the frequency subhop pattern 300-a), the UE may transmit an SRS in subhop 305-e of the hop 310-c and in the subhop 305-f of the hop 310-d in the slot 315-c, where the location of the subhop 305 in which the UE transmits the SRS in each hop 310 may be fixed.

In some examples, the index of the sounded subhop 305 may change in each slot 315. For example, the UE may be configured to transmit an SRS in a subhop 305-g of the hop 310-c and in a subhop 305-h of the hop 310-d in a slot 315-d, where each of the subhops 305-g and 305-h may have the same index value k (e.g., an index value k that is different than the index value i of the subhops 305-e and 305-f) within the hops 310-c and 310-d, respectively. That is, the subhops 305-g and 305-h may be in a different location than the subhops 305-e and 305-f in the hops 310-c and 310-d, respectively. In some cases, the slot 315-d may be a quantity of slots after the slot 315-c, for example as configured by the network entity. In some examples, the frequency subhop pattern 300-b may be a function of the slot 315 and the location of the subhop 305 (e.g., a subhop index). In some cases, the frequency subhop pattern 300-b may lead to greater frequency diversity compared to the frequency subhop pattern 300-a.

Figure 4:
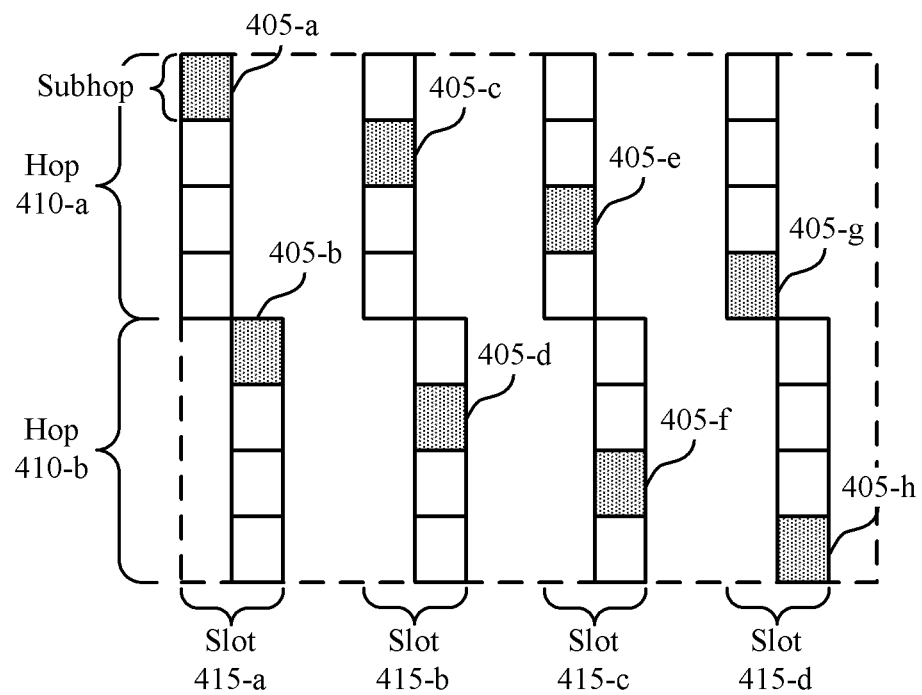
FIGS. 4 and 5 illustrate examples of frequency subhop patterns that support techniques for partial frequency sounding with frequency hopping in accordance with aspects of the present disclosure.

FIG. 4 illustrates an example of a frequency subhop pattern 400 that supports techniques for partial frequency sounding with frequency hopping in accordance with aspects of the present disclosure. In some examples, the frequency subhop pattern 400 may be implemented by aspects of the wireless communications systems 100 and 200. For example, the frequency subhop pattern 400 may be implemented by a UE to sound a subhop 405 of a hop 410 in a slot 415, for example as configured by a network entity.

The network entity and the UE may be examples of corresponding devices described herein with reference to FIGS. 1 and 2.

In some cases, the frequency subhop pattern 400 may be a cyclical (e.g., staircase) pattern such that an index of the sounded subhop 405 may be cycled per symbol or per slot 415. For example, the network entity may configure a hop 410-a and a hop 410-b each with a quantity of subhops 405 in each slot 415. In a slot 415-a, the hop 410-a may include a subhop 405-a, and the hop 410-b may include a subhop 405-b, where the subhop 405-a and the subhop 405-b may be in the same location within the hops 410-a and 410-b, respectively. That is, the subhop 405-a and the subhop 405-b may each have an index value i, or be the $i^{th}$ subhop 405 in the corresponding hop 410. In a slot 415-b, the hop 410-a may include a subhop 405-c, and the hop 410-b may include a subhop 405-d. The subhop 405-c and the subhop 405-d may be in the same location within the hops 410-a and 410-b, respectively, but in a different location compared to the subhop 405-a and the subhop 405-b in the slot 415-a. For example, according to the cyclical frequency subhop pattern 400, the subhop 405-c and the subhop 405-d may each have an index value i+1, or be the $(i+1)^{th}$ subhop 405 of the corresponding hop 410. Further, subhops 405-e and 405-f in a slot 415-c may each have an index value i+2, or be the $(i+2)^{th}$ subhop 405 of the hops 410-a and 410-b, respectively, and subhops 405-g and 405-h in a slot 415-d may each have an index value i+3, or be the $(i+3)^{th}$ subhop 405 of the hops 410-a and 410-b, respectively.

In general, according to the cyclical frequency subhop pattern 400, the UE may sound an $i^{th}$ subhop 405 of each hop 410 in a slot 415 (or symbol), and sound a $[\text{mod}((i+1), n)]^{th}$ subhop 405 of each hop 410 in a next slot 415 (or symbol), where n may represent the quantity of subhops 405 in each hop 410 and mod may represent a modulo operation that returns a remainder of a division (e.g., mod(a, b) may represent a remainder of a division of a by b). In some examples, the network entity may configure a starting subhop index (e.g., a starting RB index) for the UE, where the UE may sound subhops 405 according to the cyclical frequency subhop pattern 400 starting with the identified starting subhop index. The network entity may configure a different starting subhop index for a second UE, which may reduce a probability of collision between SRS transmissions of the UEs. In an example, the UE may use a hop 410 divided into four subhops 405 (i.e., n=4) with indices {0, 1, 2, 3}. According to the cyclical frequency subhop pattern 400, if the UE sounds a subhop 405 with index i=3 of each hop 410 in a slot 415 (or symbol), the UE may sound a subhop 405 with index [mod((i+1), n)]=0 of each hop 410 in a next slot 415 (or symbol).

In some cases, the network entity may configure a frequency subhop pattern (not shown) according to a function or procedure. For example, a linear function may use a symbol count and a quantity of subhops 405 to calculate a subhop index subHopIdx in a given symbol, where subHopIdx may be calculated according to:

$$subHopIdx = \left\lfloor \text{mod}\left(\frac{n_{SRS}}{N_b} + P_{idx}, P_F\right)\right\rfloor, \quad (1)$$

where $\lfloor x \rfloor$=floor(x) may represent a floor function that returns a greatest integer less than or equal to x, $n_{SRS}$ may be an SRS counter (e.g., an SRS count per symbol per slot 415), $P_F$ may be the quantity of subhops 405 in each hop 410, N b may be a parameter less than $P_F$ (e.g., $N_b$=1, 2, or 4), and $P_{idx}$ may be a configured starting subhop index. The subhop index subHopIdx may be between 0 and $P_F$−1. In some examples, the network entity may configure the frequency subhop pattern (not shown) according to a different function, which may be a linear function or a nonlinear function. In some cases, the frequency subhop pattern may be randomized according to a function or procedure, where the function or procedure may be based on a UE scrambling identifier (ID), an SRS count (e.g., $n_{SRS}$), a quantity of subhops 405 in each hop 410 (e.g., $P_F$), or any combination thereof. In some examples, the network entity may configure a starting subhop index $P_{idx}$ for the UE, where the UE may sound subhops 405 according to the configured frequency subhop pattern starting with the identified starting subhop index $P_{idx}$. The network entity may configure a different starting subhop index $P_{idx,2}$ for a second UE, which may reduce a probability of collision between SRS transmissions of the UEs.

In some examples, the frequency subhop pattern may be implemented as an extension of a frequency hopping pattern indicated by the network entity, in which a frequency domain starting position $k_0^{(p_i)}$ for an SRS port $p_i$ may be given by:

$$k_0^{(p_i)} = \bar{k}_0^{(p_i)} + \sum\nolimits_{b=0}^{B_{SRS}} K_{TC} M_{sc}^{SRS} n_b + \frac{K_{TC} M_{sc}^{SRS}}{P_F} n_{b_{PF}}, \quad (2)$$

where $n_{b_{PF}}$ may represent the sub-hop frequency domain starting position which may be implemented as a function of a length of an SRS sequence $M_{sc}^{SRS}$ (e.g., a quantity of SRS symbols), the partial frequency value $P_F$, a transmission comb number $K_{TC}$, and a frequency position index $n_b$. As an example, $n_{b_{PF}}$ may be given by:

$$n_{b_{PF}} = \begin{cases} 0, & b \le b_{hop} \\ \left\lfloor \text{mod}\left(\frac{n_{SRS}}{N_b} + P_{idx}, P_F\right)\right\rfloor, & b > b_{hop} \end{cases} . \quad (3)$$

In some cases, the network entity may configure the UE to use repetition of a pattern (e.g., the frequency subhop pattern 400 or another frequency subhop pattern (not shown)) for transmitting SRS in subhops 405. For example, the network entity may configure the UE to repeat the frequency subhop pattern if N<k, where N may represent the quantity of subhops 405 and k may represent a quantity of hops 410 to be sounded in an SRS bandwidth. For example, if there are four frequency subhops 405 (e.g., N=4) in each hop 410 and six hops 410 (e.g., k=6, or at least more than 4 hops) to be sounded in the SRS bandwidth, the UE may repeat the frequency subhop pattern to sound all hops 410. That is, the UE may sound a subhop 405 with a first same index in a first hop 410 and a fifth hop 410, and sound a second same index in a second hop 410 and a sixth hop 410.

Figure 5:
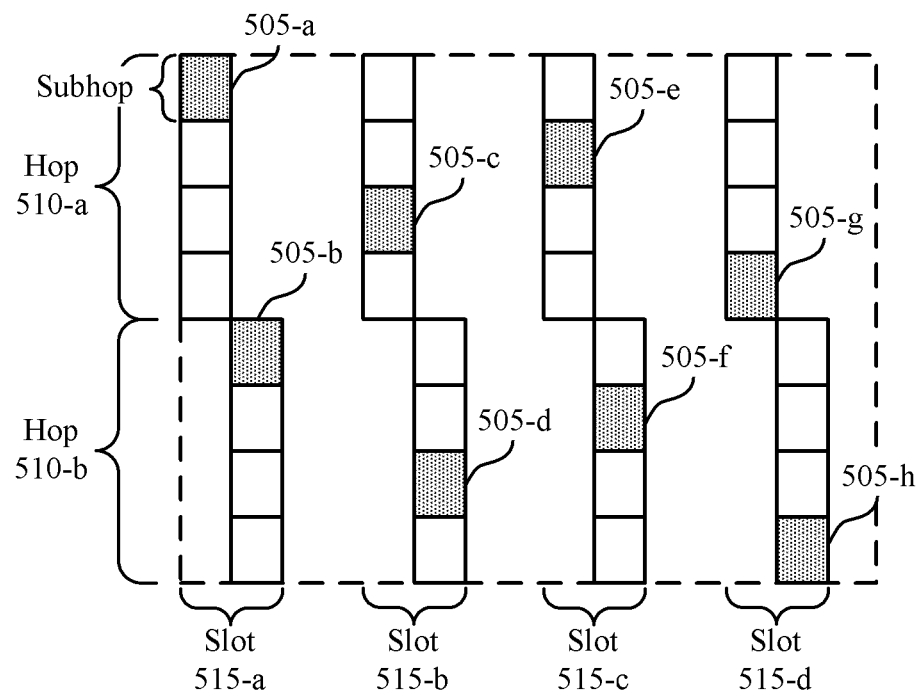

FIG. 5 illustrates an example of a frequency subhop pattern 500 that supports techniques for partial frequency sounding with frequency hopping in accordance with aspects of the present disclosure. In some examples, the frequency subhop pattern 500 may be implemented by aspects of the wireless communications systems 100 and 200. For example, the frequency subhop pattern 500 may be implemented by a UE to sound a subhop 505 of a hop 510 in a slot 515, for example as configured by a network entity.

The network entity and the UE may be examples of corresponding devices described herein with reference to FIGS. 1 and 2.

In some cases, the network entity may utilize bit-reversal permutation to configure the frequency subhop pattern 500. For example, the frequency subhop pattern 500 may be defined by indexing the elements of a sequence of values from 0 to N−1, and then by reversing the binary representations of each of the values (padded so that each of the binary representations has a same length of k digits). Each value may then be mapped to a new position given by a reversed value. For example, if k=2 and N=4, the values {0, 1, 2, 3} may have binary representations {00, 01, 10, 11}. Each binary representation may be reversed to produce {00, 10, 01, 11}, and so the values may be mapped to new positions {0, 2, 1, 3}. If k=3 and N=3, values {0, 1, 2, 3, 4, 5, 6, 7} may be mapped to new positions {0, 4, 2, 6, 1, 5, 3, 7}. If k=4 and N=16, values {0, 1, 2, 3, 4, 5, 6, 7, 8, 9, 10, 11, 12, 13, 14, 15, 16} may be mapped to new positions {0, 8, 4, 12, 2, 10, 6, 14, 1, 9, 5, 13, 3, 11, 7, 15}.

In some examples, the network entity may configure N subhops 505 in each of K hops 510 in an SRS bandwidth, and may determine the bit-reversal presentation for N=4 as 0, 2, 1, 3. Then, for the $i^{th}$ subhop 505 of each hop 510, the UE may transmit the $i^{th}$ element of the bit-reversal representation. For example, the network entity may configure a hop 510-a and a hop 510-b each with a quantity of subhops 505 in each slot 515. The hop 510-a may include a subhop 505-a, and the hop 510-b may include a subhop 505-b, where the subhop 505-a and the subhop 505-b may be in a same location within the hops 510-a and 510-b, respectively. For example, the subhop 505-a and the subhop 505-b may each have an index value $i_{515-a}$=0 in the corresponding hop 510. In a slot 515-b, the hop 510-a may include a subhop 505-c, and the hop 510-b may include a subhop 505-d. The subhop 505-c and the subhop 505-d may be in the same location within the hops 510-a and 510-b, respectively, but in a different location compared to the subhop 505-a and the subhop 505-b in slot 515-a. For example, according to the frequency subhop pattern 500, the subhop 505-c and the subhop 505-d may each have an index value $i_{515-b}$=2 in the corresponding hop 510.

Further, subhops 505-e and 505-f in a slot 515-c may each have an index value $i_{515-c}$=1 of the hops 510-a and 510-b, respectively, and subhops 505-g and 505-h in a slot 515-d may each have an index value $i_{515-d}$=3 of the hops 510-a and 510-b, respectively. In some examples, the network entity may configure a starting subhop index (e.g., a starting RB index) for the UE, where the UE may sound subhops 505 according to the frequency subhop pattern 500 that is configured starting with the identified starting subhop index. The network entity may configure a different starting subhop index for a second UE, which may reduce a probability of collision between SRS transmissions of the UEs. In some cases, each slot 515 may be a quantity of slots after a previous slot 515, for example as configured by the network entity.

Figure 6A:
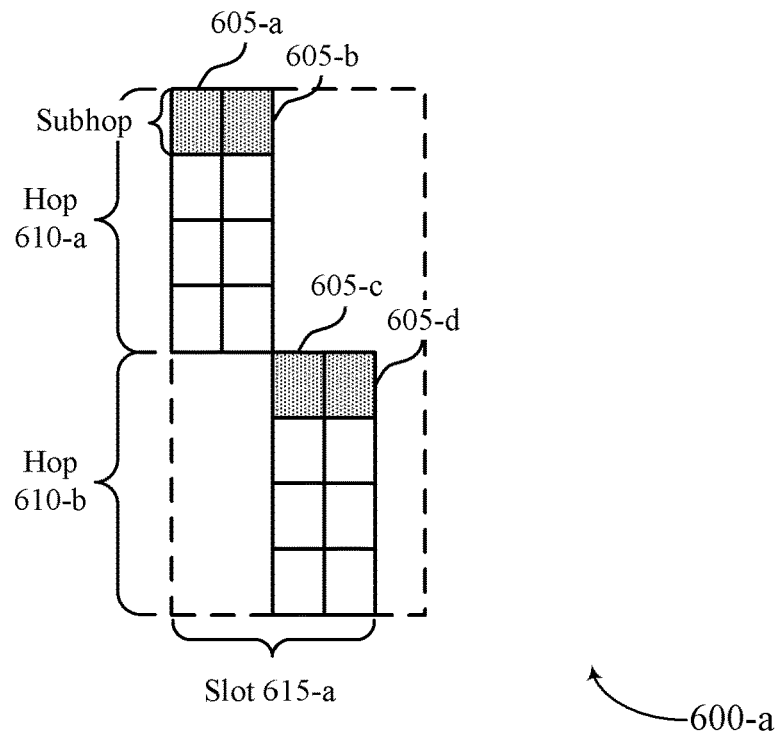
FIGS. 6A and 6B illustrate examples of frequency subhop patterns that support techniques for partial frequency sounding with frequency hopping in accordance with aspects of the present disclosure.
Figure 6B:
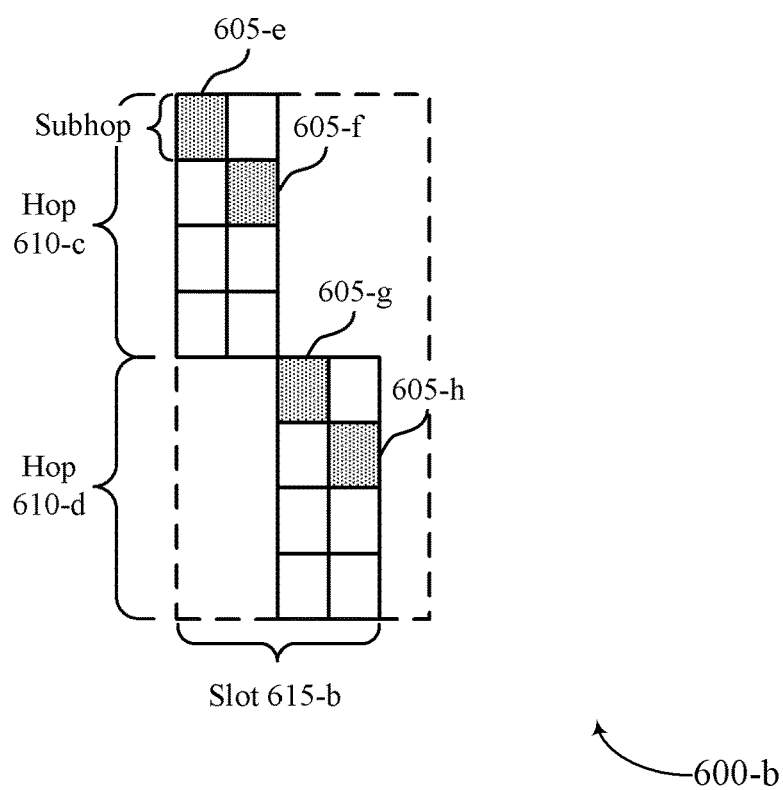

FIGS. 6A and 6B illustrate examples of a frequency subhop pattern 600-a and a frequency subhop pattern 600-b that support techniques for partial frequency sounding with frequency hopping in accordance with aspects of the present disclosure. In some examples, the frequency subhop pattern 600-a and the frequency subhop pattern 600-b may be implemented by aspects of the wireless communications systems 100 and 200. For example, one or more of the frequency subhop pattern 600-a and the frequency subhop pattern 600-b may be implemented by a UE to sound a subhop 605 of a hop 610 in a slot 615, for example as configured by a network entity. The network entity and the UE may be examples of corresponding devices described herein with reference to FIGS. 1 and 2.

In some cases, the network entity may configure the UE to transmit repetitions of the SRS in a same hop 610 across consecutive symbols to increase a probability that the transmissions are successfully received and decoded by the network entity. As such, the network entity may configure a repetition factor for the frequency subhop pattern 600-a and the frequency subhop pattern 600-b. In some cases, time resource mapping may be used to provide the UE a starting position (e.g., a slot 615) for frequency hopping. The resource mapping may also include a quantity of symbols per hop 610 and a quantity of symbols set for repetition (e.g., the repetition factor). For example, the frequency subhop pattern 600-a may include a hop 610-a and a hop 610-b each with two symbols in a slot 615-a. That is, the network entity may configure the UE with a repetition factor of 2, meaning that the UE will sound the same subhop 605 in a hop 610 in two consecutive symbols before moving on to the next hop 610.

As illustrated in FIG. 6A, the UE may transmit an SRS in subhops 605 with a same index across the repeated symbols according to the repetition factor in the frequency subhop pattern 600-a. For example, the network entity may configure a hop 610-a and a hop 610-b each with a quantity of subhops 605 in the slot 615-a. The hop 610-a may include the subhop 605-a and the repeated subhop 605-b, and the hop 610-b may include a subhop 605-c and a repeated subhop 605-d, where the subhops 605 may be in the same location within the corresponding hop 610. That is, the subhops 605-a through 605-d may each have an index value i, or be the $i^{th}$ subhop 305 in the corresponding hop 310. Accordingly, the same subhop 605 (e.g., in the same location in the hop 610) may be sounded across the repetition symbols.

As illustrated in FIG. 6B, the UE may ignore the repetition factor and use the frequency subhop pattern 600-b, which may be an example of frequency patterns described with reference to FIGS. 3A through 5. For example, the network entity may configure a hop 610-c and a hop 610-d each with a quantity of subhops 605 in a slot 615-b. The hop 610-c may include a subhop 605-e and a repeated subhop 605-f, and the hop 610-d may include a subhop 605-g and a repeated subhop 605-h, where the subhops 605 may not be in the same location within respective hops 610. That is, the subhops 605-e and 605-g may each have an index value i in the corresponding hop 610, and the subhops 605-f and 605-h may each have a different index value (e.g., i+1) in the corresponding hop 610. Accordingly, different subhops 605 may be sounded across the repetition symbols, however the frequency subhop pattern 600-b may be repeated across the quantity of SRS repetitions. In some cases, an SRS counter (e.g., an SRS count per symbol per slot 615) may be configured to count across the repetitions, enabling the frequency subhop pattern 600-b to be applied across the repetitions.

Figure 7:
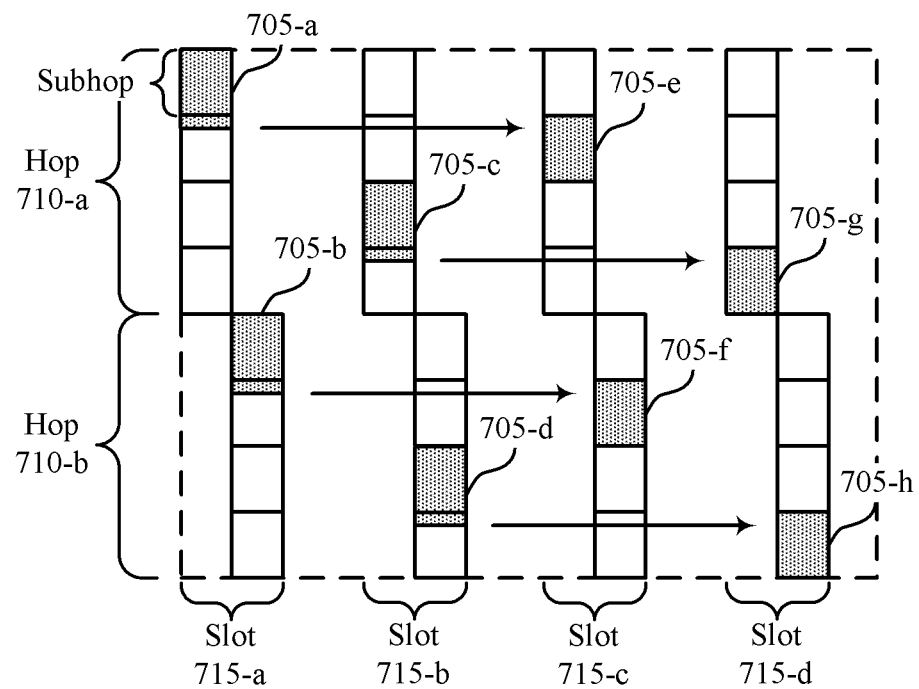
FIG. 7 illustrates an example of frequency subhop patterns that support techniques for partial frequency sounding with frequency hopping in accordance with aspects of the present disclosure.

FIG. 7 illustrates an example of a frequency subhop pattern 700 that supports techniques for partial frequency sounding with frequency hopping in accordance with aspects of the present disclosure. In some examples, the frequency subhop pattern 700 may be implemented by aspects of the wireless communications systems 100 and 200. For example, the frequency subhop pattern 700 may be implemented by a UE to sound a subhop 705 of a hop 710 in a slot 715, for example as configured by a network entity.

The network entity and the UE may be examples of corresponding devices described herein with reference to FIGS. 1 and 2.

In some cases, a frequency overlap between subhops 705 may exist (e.g., either between two adjacent symbols or between two non-adjacent symbols). In some cases, the frequency overlap may be RRC configured (e.g., RRC signaling may enable or disable the frequency overlap). In some cases, the overlapping may be defined as fixed resources (e.g., a number of resource elements (REs)) or as a percentage of the subhop bandwidths. In some cases, the overlapping frequency resources may have a different comb offset to either align the REs or introduce a staggered pattern. In some cases, the frequency overlap may enable the network entity to estimate the phase offset between the subhops 705, and therefore may enable proper interpolation and extrapolation of resources in the frequency domain.

In some examples, the network entity may configure a hop 710-a and a hop 710-b each with a quantity of subhops 705 in each slot 715. In a slot 715-a, the hop 710-a may include a subhop 705-a, and the hop 710-b may include a subhop 705-b, where the subhop 705-a and the subhop 705-b may be in the same location within the hops 710-a and 710-b, respectively. That is, the subhop 705-a and the subhop 705-b may each have an index value i, or be the $i^{th}$ subhop 705 in the corresponding hop 710. In a slot 715-c, the hop 710-a may include a subhop 705-e, and the hop 710-b may include a subhop 705-f. The subhop 705-e and the subhop 705-f may be in the same location within the hops 710-a and 710-b, respectively, but in a different location compared to the subhop 705-a and the subhop 705-b in the slot 715-a. For example, according to the frequency subhop pattern 700, the subhop 705-e and the subhop 705-f may each have an index value i+1, or be the $(i+1)^{th}$ subhop 705 of the corresponding hop 710. In some cases, the subhops 705-a and 705-b may each include one or more REs that overlap in the frequency domain with the subhops 705-e and 705-f, respectively. Similarly, subhops 705-c and 705-d in a slot 715-b may each have an index value i+2, or be the $(i+2)^{th}$ subhop 705 of the hops 710-a and 710-b, respectively. The subhops 705-c and 705-d may each include one or more REs that overlap in the frequency domain with subhops 705-g and 705-h, respectively, in a slot 715-d. The subhops 705-g and 705-h may each have an index value i+3, or be the $(i+3)^{th}$ subhop 705 of the hops 710-a and 710-b, respectively. The network entity may use this overlapping to estimate the phase offset between the subhops 705, therefore enabling proper interpolation and extrapolation of the REs in the frequency domain.

Figure 8:
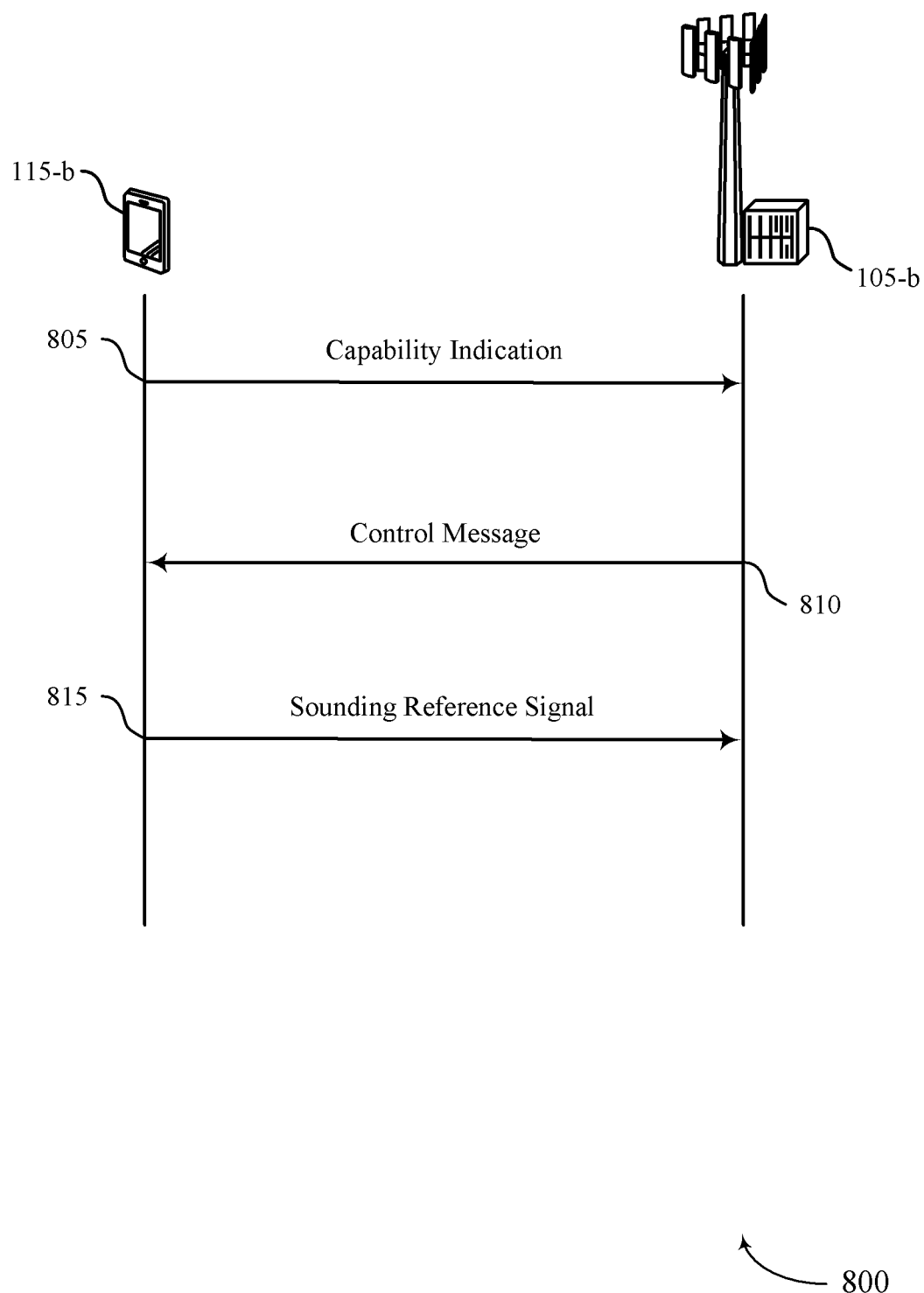
FIG. 8 illustrates an example of a process flow that supports techniques for partial frequency sounding with frequency hopping in accordance with aspects of the present disclosure.

FIG. 8 illustrates an example of a process flow 800 that supports techniques for partial frequency sounding with frequency hopping in accordance with aspects of the present disclosure. The process flow 800 may implement or be implemented by aspects of the wireless communications system 100 and 200. For example, the process flow 800 may include example operations associated with one or more of a network entity 105-b or a UE 115-b, which may be examples of corresponding devices described with reference to FIGS. 1 and 2. In the following description of the process flow 800, the operations between the network entity 105-b and the UE 115-b may be performed in a different order than the example order shown, or the operations performed by the network entity 105-b and the UE 115-b may be performed in different orders or at different times. Some operations may also be omitted from the process flow 800, and other operations may be added to the process flow 800. The operations performed by the network entity 105-b and the UE 115-b may support improvements to frequency sounding operations and, in some examples, may promote improvements to communications efficiency, among other benefits.

At 805, the UE 115-b may transmit, to the network entity 105-a, an indication of a capability of the UE 115-b to use partial frequency sounding with frequency hopping. In some cases, the capability of the UE 115-b to use a frequency subhop pattern may include dynamic support of frequency subhop pattern activation and deactivation or UE-assisted information indicating the preferred pattern of the UE 115-b.

At 810, the UE 115-b may receive, from the network entity 105-a, a control message identifying one or more frequency subhop patterns for application to transmission by the UE 115-b of an SRS. In some examples, the control message may be included an RRC message identifying that partial frequency sounding is activated at the UE 115-b, for example based on the capability indication. Additionally, or alternatively, the control message may be received in separate control signaling, such as other RRC signaling, a MAC-CE, DCI, or any combination thereof. In some examples, the control message may identify a starting subhop index for the frequency subhop pattern.

In some cases, the one or more frequency subhop patterns may be RRC configured on an SRS resource level or on an SRS resource set level. In some cases, multiple frequency subhop patterns may be configured, where one frequency subhop pattern may be the default configuration. In some cases, the frequency subhop pattern may depend on a quantity of SRS symbols per SRS resource. In some cases, frequency subhop patterns may be applicable to SRSs with either aperiodic, semi-persistent, or periodic time-domain behavior. For an aperiodic SRS configuration, the frequency subhop pattern may be dynamically indicated using triggering DCI. For a semi-persistent SRS configuration, the frequency subhop pattern may be indicated using a MAC-CE activation command. For a periodic SRS configuration, the default frequency subhop pattern may be used until a MAC-CE is received to activate or deactivate partial frequency sounding or switch to a different frequency subhop pattern.

In some examples, partial frequency sounding may be indicated through Layer 1 (L1) or Layer 2 (L2) signaling. In some cases, a MAC-CE command may indicate activation or deactivation of partial frequency sounding. The indication may be per SRS resource set or per bandwidth part (BWP) per cell. In some cases, the MAC-CE indication may be applicable to SRS for all time-domain behaviors (e.g., aperiodic, semi-persistent, and periodic). The MAC-CE may indicate which frequency subhop pattern identified by the RRC signaling may be used.

In some cases, partial frequency sounding may be indicated through DCI (e.g., L2 signaling). In some cases, the DCI may include a bitfield that may indicate whether partial frequency sounding is activated and which frequency subhop pattern may be used. In some cases, partial frequency sounding may be activated with an indicated frequency subhop pattern until another DCI is received that deactivates the partial frequency sounding or indicates a different frequency subhop pattern. In some cases, the DCI may utilize a non-scheduling DCI format 0_1 or DCI format 0_2 to repurpose an unused bitfield. In some cases, one bit may be repurposed to indicate activation and deactivation. In some cases, N bits (e.g., N=2 for 4 frequency subhop patterns) may be repurposed for indication of frequency subhop patterns. In some cases, the indication may be for all SRS sets, per SRS set, or per SRS resource.

In some cases, a MAC-CE may be used to activate a semi-persistent scheduling (SPS) SRS resource set. A field or bit in the MAC-CE may be used to indicate whether the MAC-CE may be activating or deactivating partial frequency sounding, and may also indicate which frequency subhop pattern identified by the RRC signaling is to be used. In some cases, one bit may be used to indicate whether partial frequency sounding is enabled or disabled, while another bit may be used to indicate which frequency subhop pattern (or patterns) may be used (e.g., up to two patterns). In some cases, two reserve bits may be used jointly to indicate whether partial frequency sounding is enabled or disabled, and may indicate which frequency subhop pattern (or patterns) may be used (up to three patterns).

At 815, the UE 115-b may transmit, to the network entity 105-b, the SRS in a selected frequency subhop in each frequency hop of a set of frequency hops based on the frequency subhop pattern. In some cases, the frequency subhop pattern may be fixed across all slots such that the same subhop is sounded across all hops, or the frequency subhop pattern may be fixed per slot. In some cases, the frequency subhop pattern may be cyclical, or may be based on a function or procedure (e.g., randomization). The operations performed by the network entity 105-b and the UE 115-b may support improvements to frequency sounding operations and, in some examples, may promote improvements to communications efficiency, among other benefits.

Figure 9:
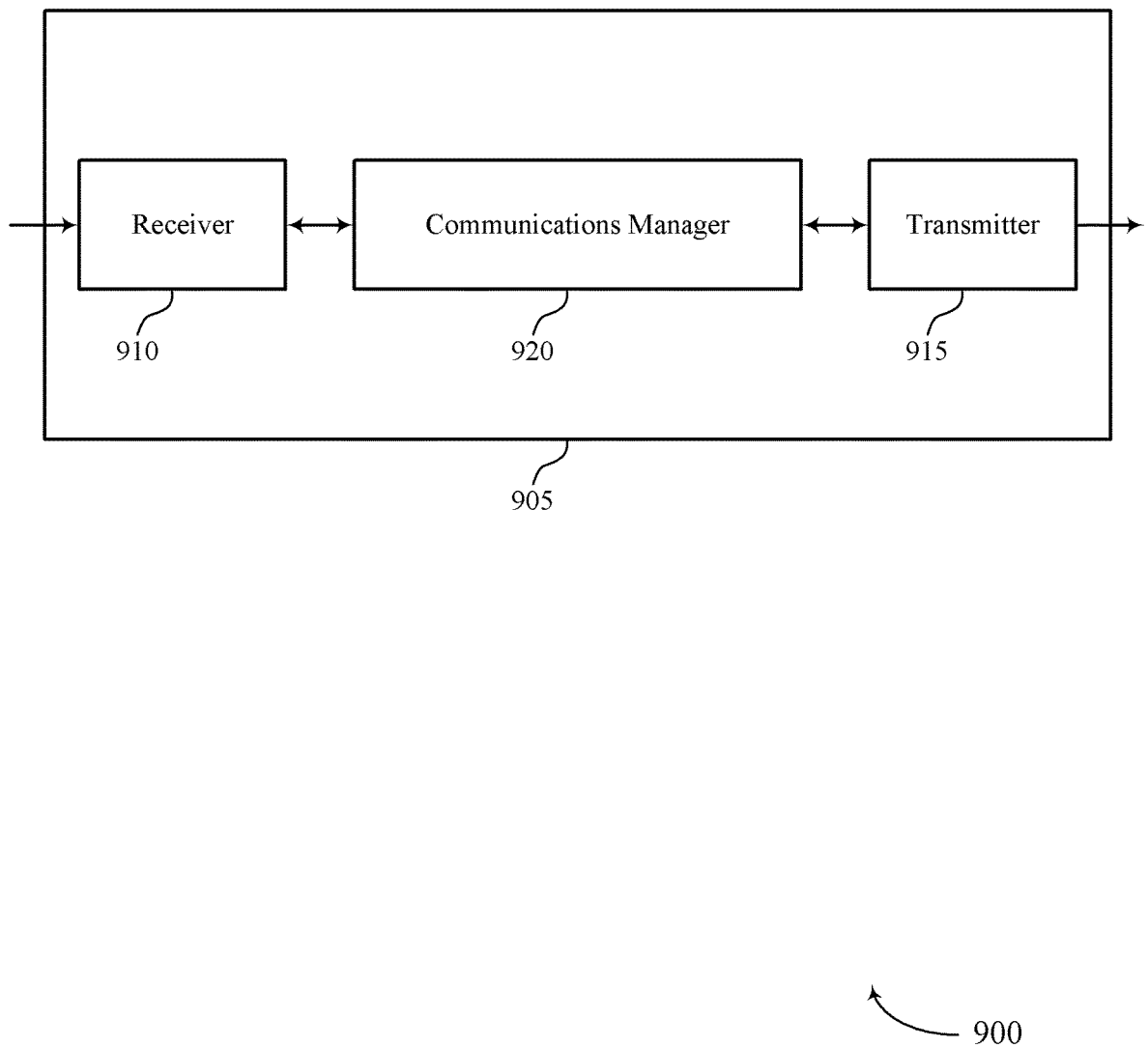
FIGS. 9 and 10 show block diagrams of devices that support techniques for partial frequency sounding with frequency hopping in accordance with aspects of the present disclosure.

FIG. 9 shows a block diagram 900 of a device 905 that supports techniques for partial frequency sounding with frequency hopping in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for partial frequency sounding with frequency hopping). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for partial frequency sounding with frequency hopping). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for partial frequency sounding with frequency hopping as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for transmitting an indication of a capability of the UE to use partial frequency sounding with frequency hopping. The communications manager 920 may be configured as or otherwise support a means for receiving, based on transmitting the indication, a control message identifying a frequency subhop pattern for application to transmission by the UE of an SRS. The communications manager 920 may be configured as or otherwise support a means for transmitting the SRS in a selected frequency subhop in each frequency hop of a set of frequency hops based on the frequency subhop pattern.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for efficient power consumption, more efficient utilization of communication resources, and more effective allocation of SRS resources for frequency sounding.

Figure 10:
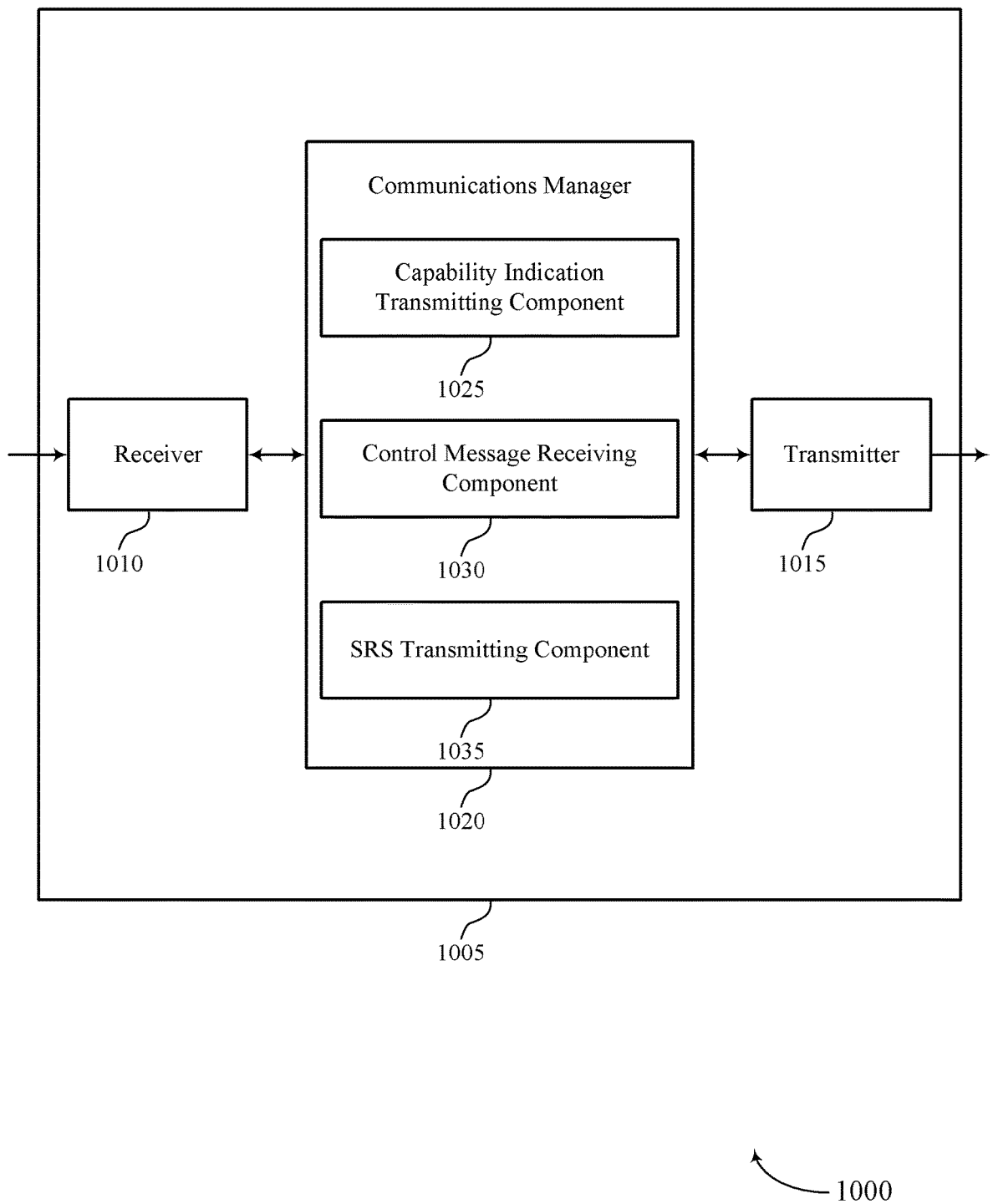

FIG. 10 shows a block diagram 1000 of a device 1005 that supports techniques for partial frequency sounding with frequency hopping in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for partial frequency sounding with frequency hopping). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for partial frequency sounding with frequency hopping). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for partial frequency sounding with frequency hopping as described herein. For example, the communications manager 1020 may include a capability indication transmitting component 1025, a control message receiving component 1030, an SRS transmitting component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The capability indication transmitting component 1025 may be configured as or otherwise support a means for transmitting an indication of a capability of the UE to use partial frequency sounding with frequency hopping. The control message receiving component 1030 may be configured as or otherwise support a means for receiving, based on transmitting the indication, a control message identifying a frequency subhop pattern for application to transmission by the UE of an SRS. The SRS transmitting component 1035 may be configured as or otherwise support a means for transmitting the SRS in a selected frequency subhop in each frequency hop of a set of frequency hops based on the frequency subhop pattern.

Figure 11:
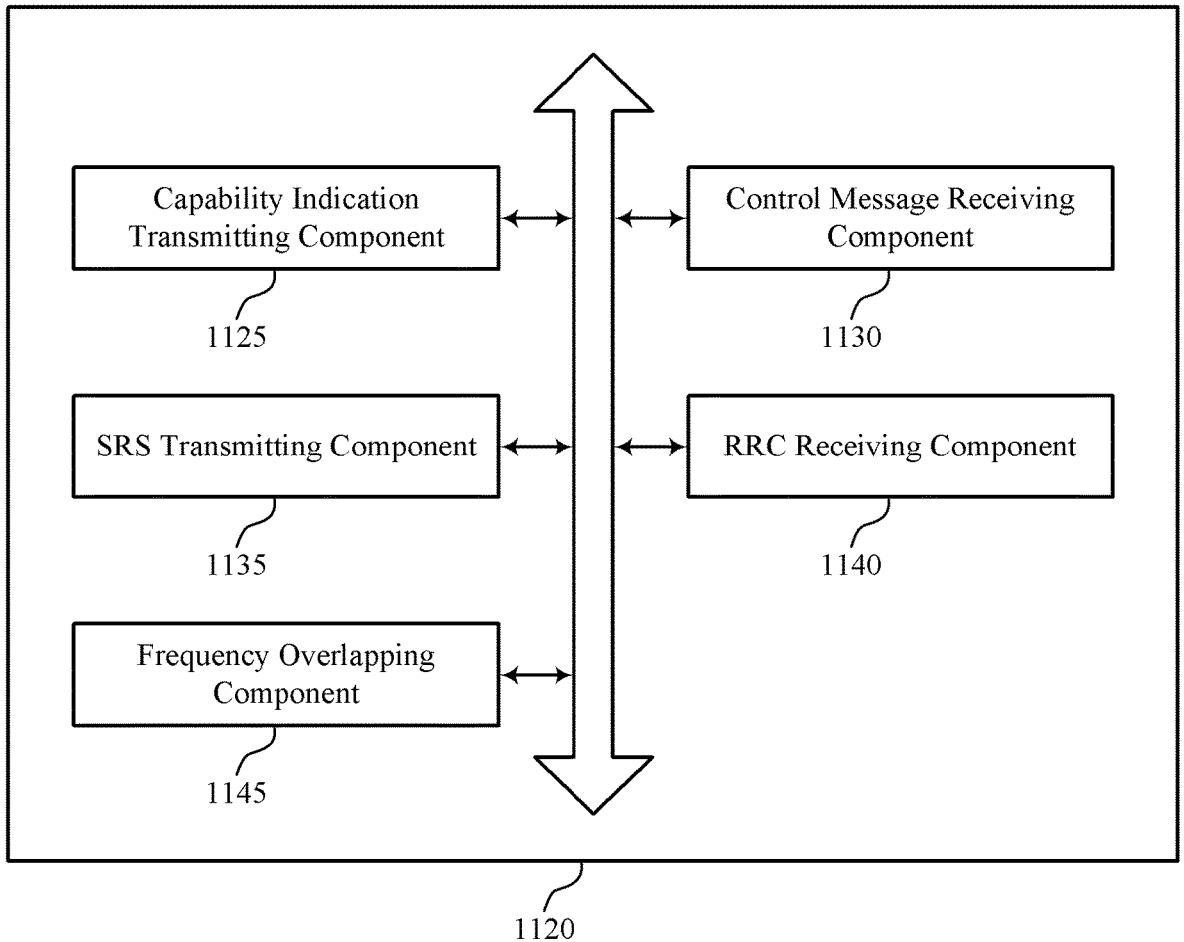
FIG. 11 shows a block diagram of a communications manager that supports techniques for partial frequency sounding with frequency hopping in accordance with aspects of the present disclosure.

FIG. 11 shows a block diagram 1100 of a communications manager 1120 that supports techniques for partial frequency sounding with frequency hopping in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for partial frequency sounding with frequency hopping as described herein. For example, the communications manager 1120 may include a capability indication transmitting component 1125, a control message receiving component 1130, an SRS transmitting component 1135, an RRC receiving component 1140, a frequency overlapping component 1145, or any combination thereof. Each of these components may communicate, directly or indirectly, with one another (e.g., via one or more buses).

The communications manager 1120 may support wireless communication at a UE in accordance with examples as disclosed herein. The capability indication transmitting component 1125 may be configured as or otherwise support a means for transmitting an indication of a capability of the UE to use partial frequency sounding with frequency hopping. The control message receiving component 1130 may be configured as or otherwise support a means for receiving, based on transmitting the indication, a control message identifying a frequency subhop pattern for application to transmission by the UE of an SRS. The SRS transmitting component 1135 may be configured as or otherwise support a means for transmitting the SRS in a selected frequency subhop in each frequency hop of a set of frequency hops based on the frequency subhop pattern.

In some examples, the RRC receiving component 1140 may be configured as or otherwise support a means for receiving an RRC message identifying that partial frequency sounding is activated, where the control message identifying the frequency subhop pattern is received based on receiving the RRC message.

In some examples, the RRC message identifies one or more frequency subhop patterns, the one or more frequency subhop patterns including the frequency subhop pattern identified in the control message.

In some examples, the RRC message further identifies a scheduling configuration for the SRS. In some examples, the frequency subhop pattern identified in the control message is based on the identified scheduling configuration.

In some examples, the identified scheduling configuration includes an aperiodic configuration, a semi-persistent configuration, or a periodic configuration. In some examples, the control message identifies a starting subhop index for the frequency subhop pattern.

In some examples, to support receiving the control message identifying the frequency subhop pattern, the control message receiving component 1130 may be configured as or otherwise support a means for receiving a MAC-CE identifying the frequency subhop pattern and that partial frequency sounding is activated, where the MAC-CE includes the control message.

In some examples, a first bit of the MAC-CE identifies that partial frequency sounding is activated, and a second bit the MAC-CE identifies the frequency subhop pattern. In some examples, a set of bits of the message in the MAC-CE identifies the frequency subhop pattern and that partial frequency sounding is activated.

In some examples, to support receiving the control message identifying the frequency subhop pattern, the control message receiving component 1130 may be configured as or otherwise support a means for receiving a DCI message identifying the frequency subhop pattern and that partial frequency sounding is activated, where the DCI message includes the control message.

In some examples, to support transmitting the SRS in the selected frequency subhop in each frequency hop, the SRS transmitting component 1135 may be configured as or otherwise support a means for transmitting the SRS using a first same frequency subhop in each frequency hop within a first slot and a second same frequency subhop in each frequency hop within a second slot, the first same frequency subhop and the second same frequency subhop corresponding to the selected frequency subhop.

In some examples, to support transmitting the SRS in the selected frequency subhop in each frequency hop, the SRS transmitting component 1135 may be configured as or otherwise support a means for transmitting the SRS using a same frequency subhop in each frequency hop, the same frequency subhop corresponding to the selected frequency subhop.

In some examples, to support transmitting the SRS in the selected frequency subhop in each frequency hop, the SRS transmitting component 1135 may be configured as or otherwise support a means for transmitting the SRS using a first cyclic frequency subhop in each frequency hop within a first slot or a first symbol and a second cyclic frequency subhop in each frequency hop within a second slot or a second symbol, the first cyclic frequency subhop and the second cyclic frequency subhop corresponding to the selected frequency subhop.

In some examples, to support transmitting the SRS in the selected frequency subhop in each frequency hop, the SRS transmitting component 1135 may be configured as or otherwise support a means for transmitting the SRS using a first frequency subhop in a first frequency hop and a second frequency subhop in a second frequency hop, the first frequency subhop and the second frequency subhop corresponding to the selected frequency subhop, where the first frequency subhop and the second frequency subhop are determined in accordance with a bit-reversal representation based on a first quantity of frequency subhops across a second quantity of frequency hops.

In some examples, to support transmitting the SRS in the selected frequency subhop in each frequency hop, the SRS transmitting component 1135 may be configured as or otherwise support a means for transmitting the SRS using a first frequency subhop with a value zero in a first frequency hop and a second frequency subhop with a value two in a second frequency hop, the first frequency subhop and the second frequency subhop corresponding to the selected frequency subhop, where the first frequency subhop and the second frequency subhop are determined in accordance with a bit-reversal representation based on each of the first frequency hop and the second frequency hop comprising four frequency subhops.

In some examples, to support transmitting the SRS in the selected frequency subhop in each frequency hop, the SRS transmitting component 1135 may be configured as or otherwise support a means for transmitting the SRS using a first frequency subhop in a first frequency hop and a second frequency subhop in a second frequency hop, the first frequency subhop and the second frequency subhop corresponding to the selected frequency subhop, where the first frequency subhop and the second frequency subhop are determined in accordance with a function that is based on a symbol count and a partial frequency sounding configuration.

In some examples, to support transmitting the SRS in the selected frequency subhop in each frequency hop, the SRS transmitting component 1135 may be configured as or otherwise support a means for transmitting the SRS using a first frequency subhop for a first frequency hop and a second frequency subhop for a second frequency hop, the first frequency subhop and the second frequency subhop corresponding to the selected frequency subhop, where the first frequency subhop and the second frequency subhop are determined in accordance with a randomization procedure that is based on an identifier associated with the UE and a partial frequency sounding configuration.

In some examples, to support transmitting the SRS in the selected frequency subhop in each frequency hop, the SRS transmitting component 1135 may be configured as or otherwise support a means for transmitting the SRS using a frequency subhop in a frequency hop, the frequency subhop corresponding to the selected frequency subhop, where the frequency subhop is determined in accordance with a repetition of the frequency subhop pattern.

In some examples, to support transmitting the SRS in the selected frequency subhop in each frequency hop, the SRS transmitting component 1135 may be configured as or otherwise support a means for transmitting the SRS using a same frequency subhop in a first frequency hop and a second frequency hop, the same frequency subhop corresponding to the selected frequency subhop, where the same frequency subhop is determined in accordance with a configured repetition factor.

In some examples, to support transmitting the SRS in the selected frequency subhop in each frequency hop, the SRS transmitting component 1135 may be configured as or otherwise support a means for transmitting the SRS using a first frequency subhop in a first frequency hop and a second frequency subhop in a second frequency hop, the first frequency subhop and the second frequency subhop corresponding to the selected frequency subhop, where the first frequency subhop and the second frequency subhop are determined in accordance with a configured repetition factor.

In some examples, the frequency overlapping component 1145 may be configured as or otherwise support a means for receiving a configuration message identifying a frequency overlap configuration associated with frequency subhops in each frequency hop of the set of frequency hops, where transmitting the SRS in the selected frequency subhop is further based on the frequency overlap configuration.

Figure 12:
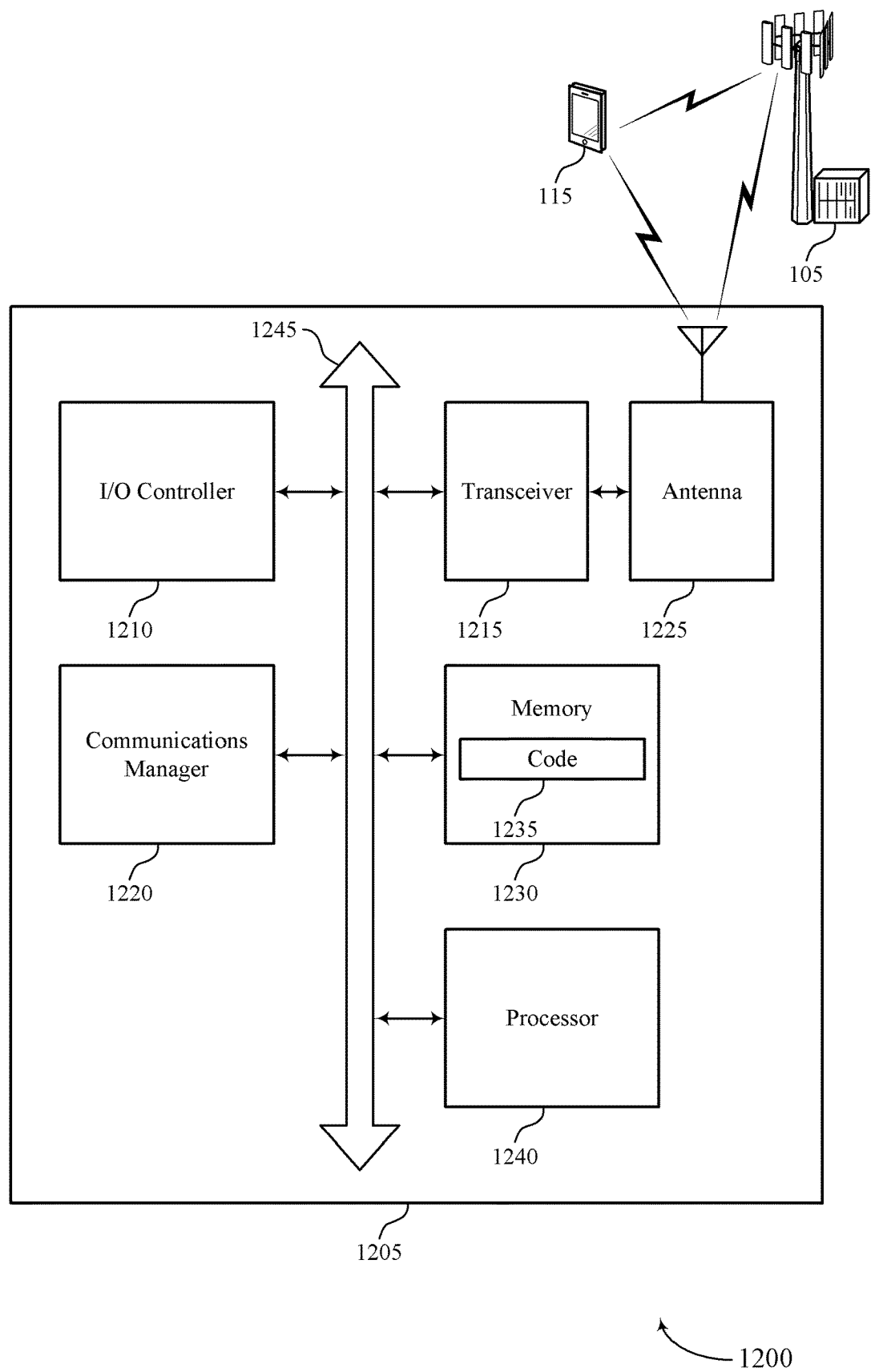
FIG. 12 shows a diagram of a system including a device that supports techniques for partial frequency sounding with frequency hopping in accordance with aspects of the present disclosure.

FIG. 12 shows a diagram of a system 1200 including a device 1205 that supports techniques for partial frequency sounding with frequency hopping in accordance with aspects of the present disclosure. The device 1205 may be an example of or include the components of a device 905, a device 1005, or a UE 115 as described herein. The device 1205 may communicate wirelessly with one or more network entities 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions.

The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for partial frequency sounding with frequency hopping). For example, the device 1205 or a component of the device 1205 may include a processor 1240 and memory 1230 coupled with the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for transmitting an indication of a capability of the UE to use partial frequency sounding with frequency hopping. The communications manager 1220 may be configured as or otherwise support a means for receiving, based on transmitting the indication, a control message identifying a frequency subhop pattern for application to transmission by the UE of an SRS. The communications manager 1220 may be configured as or otherwise support a means for transmitting the SRS in a selected frequency subhop in each frequency hop of a set of frequency hops based on the frequency subhop pattern.

By including or configuring the communications manager 1220 in accordance with examples as described herein, the device 1205 may support techniques for improved communication reliability, improved user experience related to increased data throughput, more efficient utilization of communication resources, improved coordination between devices, increased data throughput, and increased uplink coverage.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for partial frequency sounding with frequency hopping as described herein, or the processor 1240 and the memory 1230 may be otherwise configured to perform or support such operations.

Figure 13:
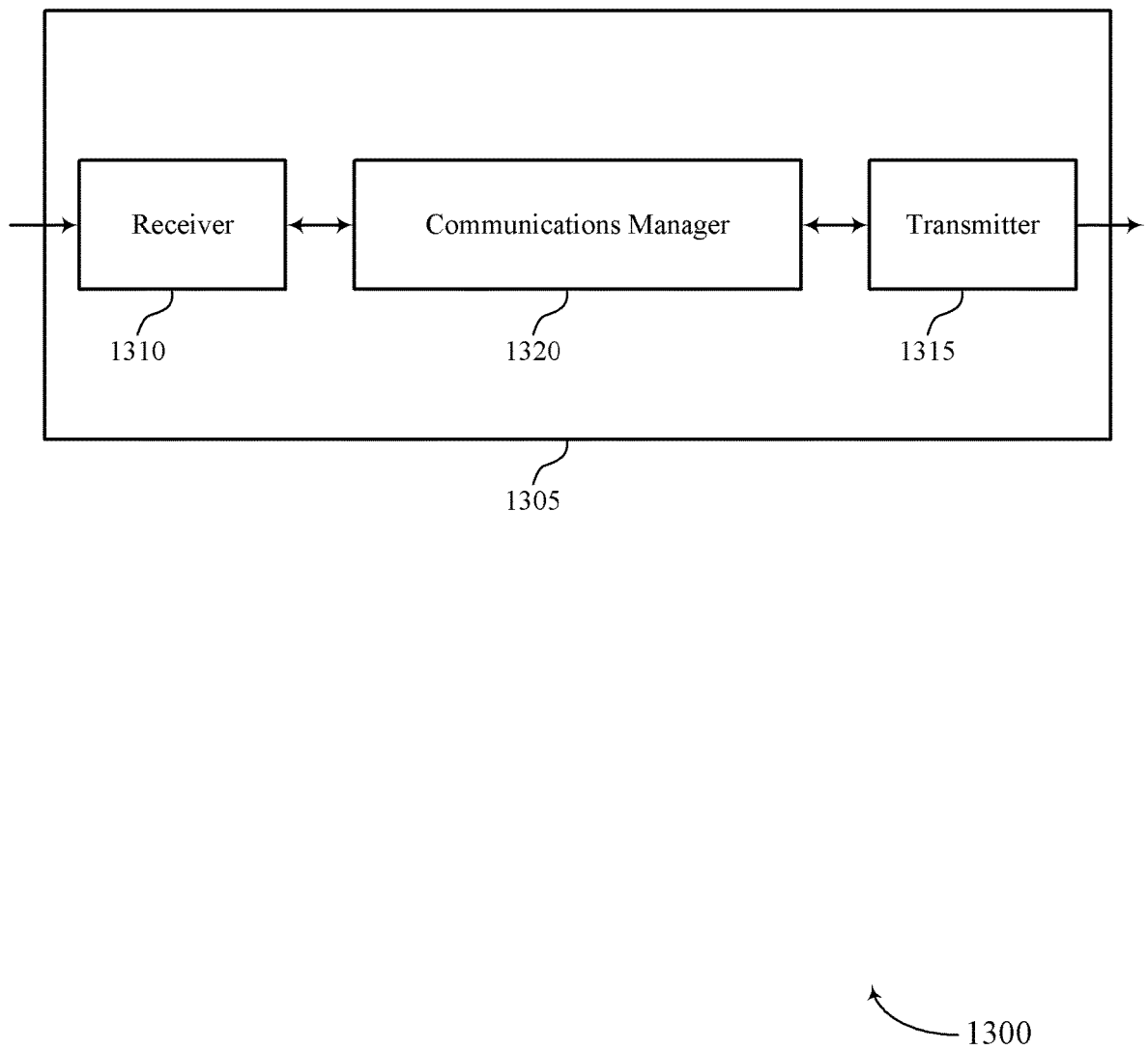
FIGS. 13 and 14 show block diagrams of devices that support techniques for partial frequency sounding with frequency hopping in accordance with aspects of the present disclosure.

FIG. 13 shows a block diagram 1300 of a device 1305 that supports techniques for partial frequency sounding with frequency hopping in accordance with aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for partial frequency sounding with frequency hopping). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for partial frequency sounding with frequency hopping). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of techniques for partial frequency sounding with frequency hopping as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a network entity in accordance with examples as disclosed herein. For example, the communications manager 1320 may be configured as or otherwise support a means for receiving an indication of a capability of a UE to use partial frequency sounding with frequency hopping. The communications manager 1320 may be configured as or otherwise support a means for transmitting, based on receiving the indication, a control message identifying a frequency subhop pattern for application to transmission by the UE of an SRS. The communications manager 1320 may be configured as or otherwise support a means for receiving the SRS in a selected frequency subhop in each frequency hop of a set of frequency hops based on the frequency subhop pattern.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for efficient power consumption, more efficient utilization of communication resources, and more effective allocation of SRS resources for frequency sounding.

Figure 14:
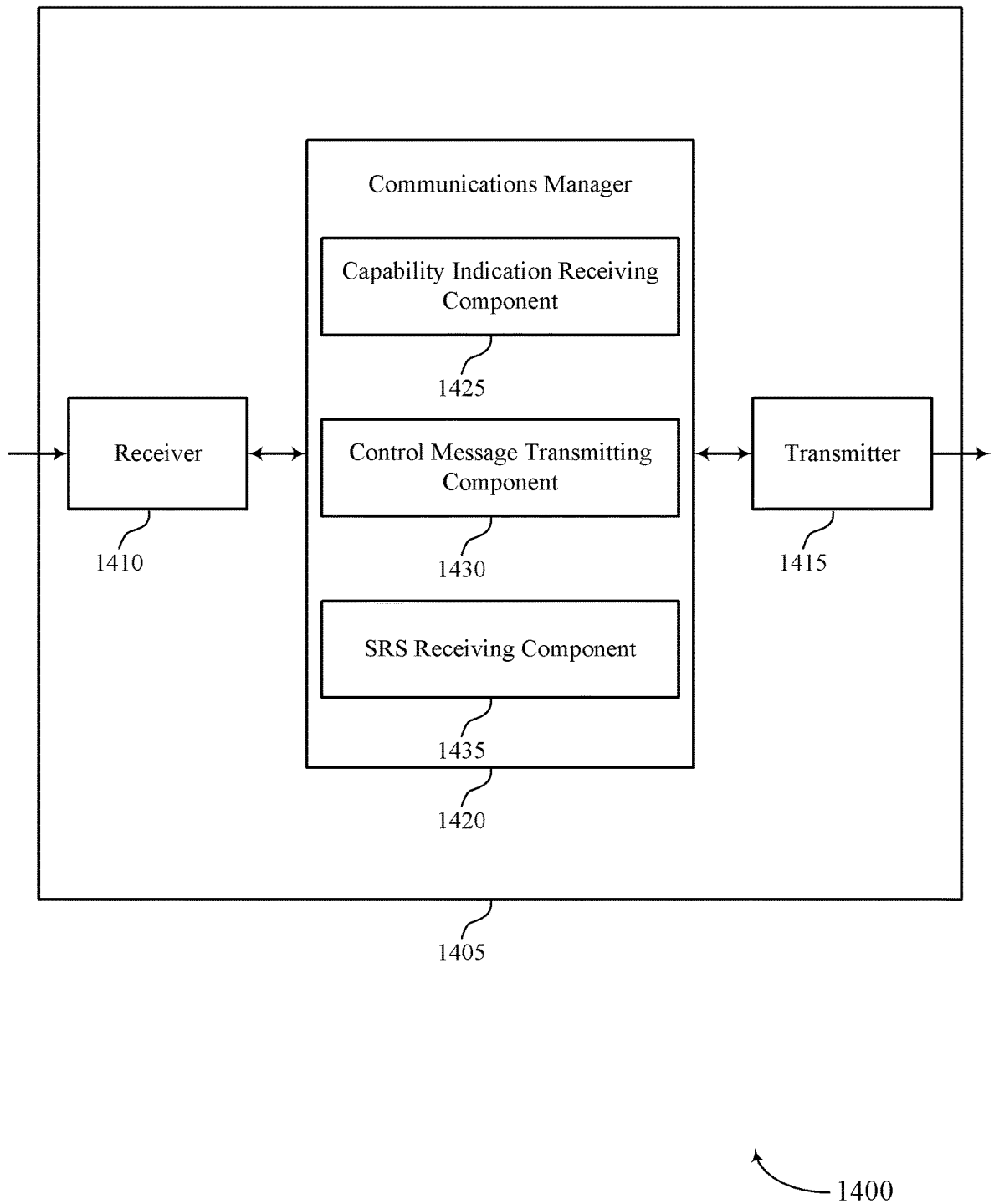

FIG. 14 shows a block diagram 1400 of a device 1405 that supports techniques for partial frequency sounding with frequency hopping in accordance with aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for partial frequency sounding with frequency hopping). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for partial frequency sounding with frequency hopping). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of techniques for partial frequency sounding with frequency hopping as described herein. For example, the communications manager 1420 may include a capability indication receiving component 1425, a control message transmitting component 1430, an SRS receiving component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a network entity in accordance with examples as disclosed herein. The capability indication receiving component 1425 may be configured as or otherwise support a means for receiving an indication of a capability of a UE to use partial frequency sounding with frequency hopping. The control message transmitting component 1430 may be configured as or otherwise support a means for transmitting, based on receiving the indication, a control message identifying a frequency subhop pattern for application to transmission by the UE of an SRS. The SRS receiving component 1435 may be configured as or otherwise support a means for receiving the SRS in a selected frequency subhop in each frequency hop of a set of frequency hops based on the frequency subhop pattern.

Figure 15:
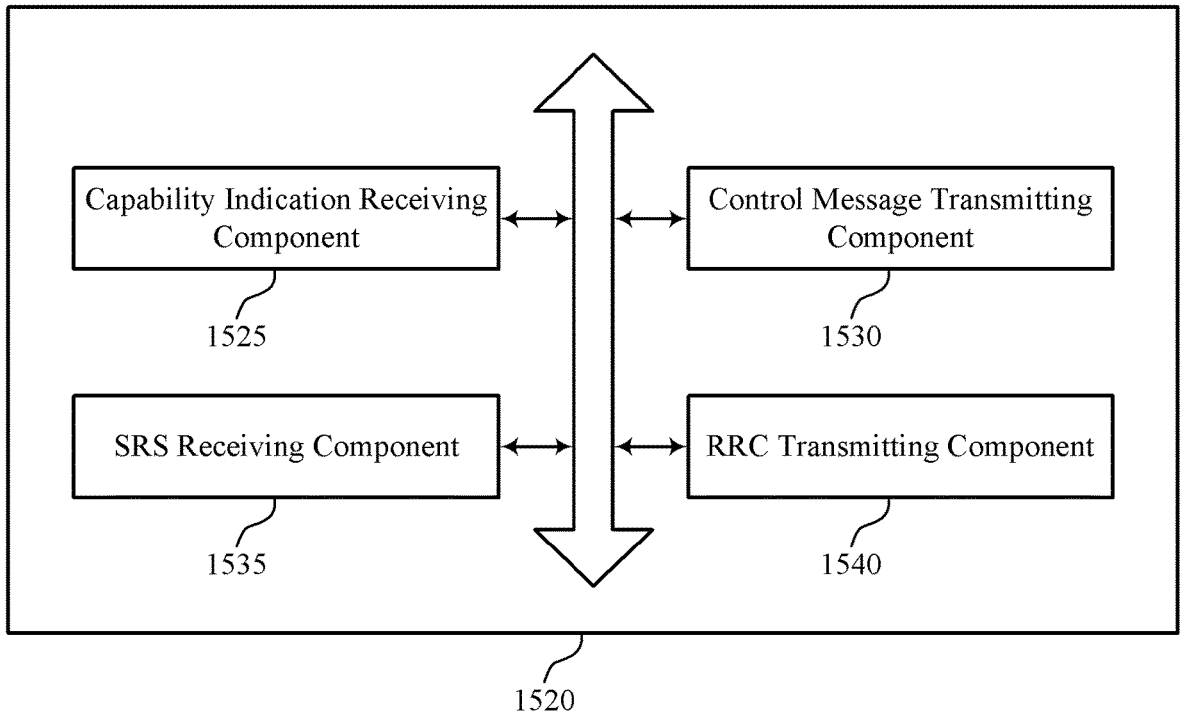
FIG. 15 shows a block diagram of a communications manager that supports techniques for partial frequency sounding with frequency hopping in accordance with aspects of the present disclosure.

FIG. 15 shows a block diagram 1500 of a communications manager 1520 that supports techniques for partial frequency sounding with frequency hopping in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of techniques for partial frequency sounding with frequency hopping as described herein. For example, the communications manager 1520 may include a capability indication receiving component 1525, a control message transmitting component 1530, an SRS receiving component 1535, an RRC transmitting component 1540, or any combination thereof. Each of these components may communicate, directly or indirectly, with one another (e.g., via one or more buses).

The communications manager 1520 may support wireless communication at a network entity in accordance with examples as disclosed herein. The capability indication receiving component 1525 may be configured as or otherwise support a means for receiving an indication of a capability of a UE to use partial frequency sounding with frequency hopping. The control message transmitting component 1530 may be configured as or otherwise support a means for transmitting, based on receiving the indication, a control message identifying a frequency subhop pattern for application to transmission by the UE of an SRS. The SRS receiving component 1535 may be configured as or otherwise support a means for receiving the SRS in a selected frequency subhop in each frequency hop of a set of frequency hops based on the frequency subhop pattern.

In some examples, the RRC transmitting component 1540 may be configured as or otherwise support a means for transmitting an RRC message identifying that partial frequency sounding is activated, where the control message identifying the frequency subhop pattern is transmitted based on transmitting the RRC message.

In some examples, the RRC message identifies one or more frequency subhop patterns, the one or more frequency subhop patterns including the frequency subhop pattern identified in the control message.

In some examples, the RRC message further identifies a scheduling configuration for the SRS. In some examples, the frequency subhop pattern identified in the control message is based on the identified scheduling configuration.

In some examples, the identified scheduling configuration includes an aperiodic configuration, a semi-persistent configuration, or a periodic configuration.

In some examples, to support transmitting the control message identifying the frequency subhop pattern, the control message transmitting component 1530 may be configured as or otherwise support a means for transmitting a MAC-CE identifying the frequency subhop pattern and that partial frequency sounding is activated, where the MAC-CE includes the control message.

In some examples, a first bit of the MAC-CE identifies that partial frequency sounding is activated, and a second bit the MAC-CE identifies the frequency subhop pattern.

In some examples, a set of bits of the message in the MAC-CE identifies the frequency subhop pattern and that partial frequency sounding is activated. In some examples, the control message identifies a starting subhop index for the frequency subhop pattern.

In some examples, to support transmitting the control message identifying the frequency subhop pattern, the control message transmitting component 1530 may be configured as or otherwise support a means for transmitting a DCI message identifying the frequency subhop pattern and that partial frequency sounding is activated, where the DCI message includes the control message.

Figure 16:
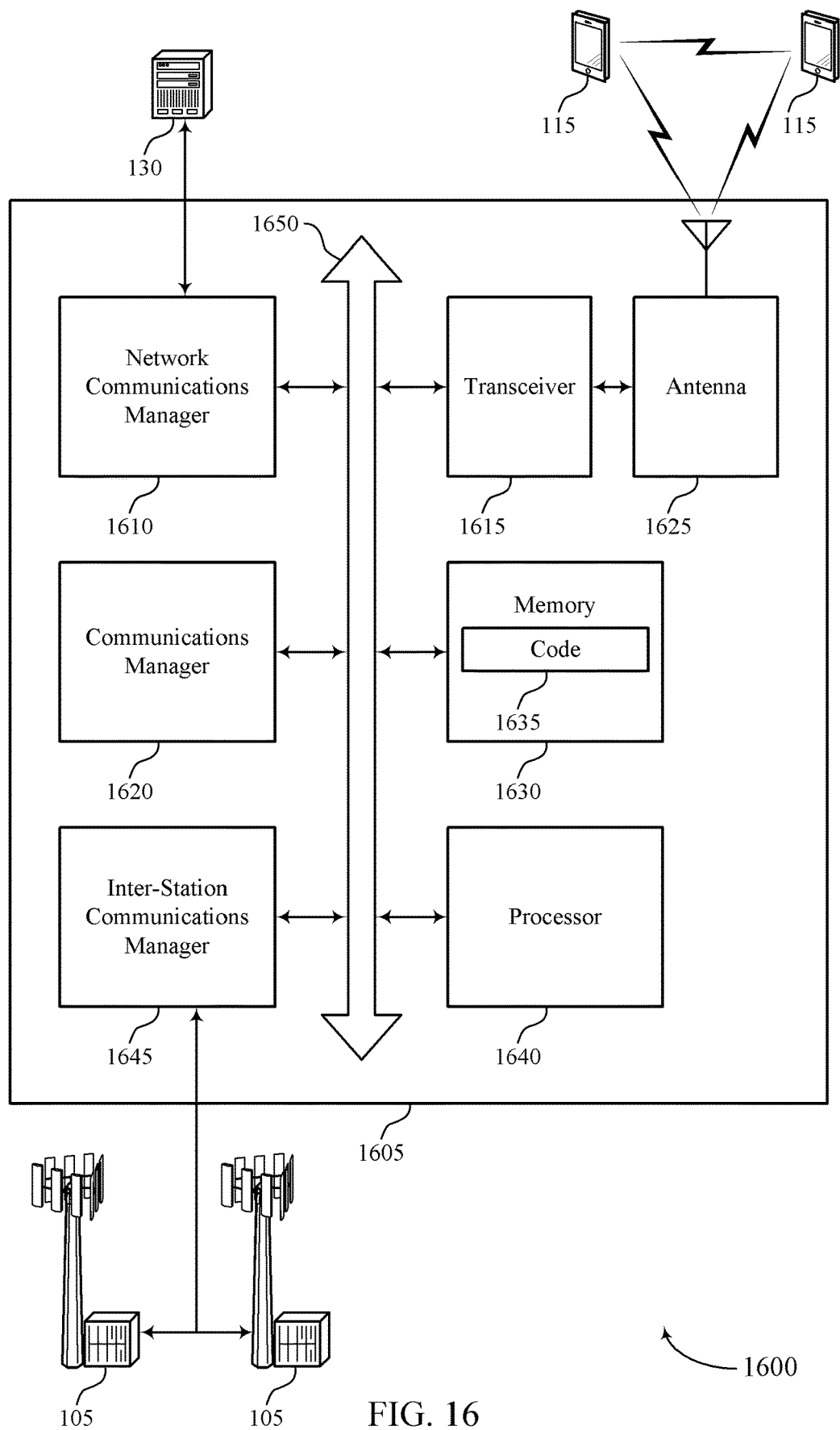
FIG. 16 shows a diagram of a system including a device that supports techniques for partial frequency sounding with frequency hopping in accordance with aspects of the present disclosure.

FIG. 16 shows a diagram of a system 1600 including a device 1605 that supports techniques for partial frequency sounding with frequency hopping in accordance with aspects of the present disclosure. The device 1605 may be an example of or include the components of a device 1305, a device 1405, or a network entity 105 as described herein. The device 1605 may communicate wirelessly with one or more network entities 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for partial frequency sounding with frequency hopping). For example, the device 1605 or a component of the device 1605 may include a processor 1640 and memory 1630 coupled with the processor 1640, the processor 1640 and memory 1630 configured to perform various functions described herein.

The inter-station communications manager 1645 may manage communications with other network entities 105, and may include a controller or scheduler for controlling communications with UEs 115 in cooperation with other network entities 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between network entities 105.

The communications manager 1620 may support wireless communication at a network entity in accordance with examples as disclosed herein. For example, the communications manager 1620 may be configured as or otherwise support a means for receiving an indication of a capability of a UE to use partial frequency sounding with frequency hopping. The communications manager 1620 may be configured as or otherwise support a means for transmitting, based on receiving the indication, a control message identifying a frequency subhop pattern for application to transmission by the UE of an SRS. The communications manager 1620 may be configured as or otherwise support a means for receiving the SRS in a selected frequency subhop in each frequency hop of a set of frequency hops based on the frequency subhop pattern.

By including or configuring the communications manager 1620 in accordance with examples as described herein, the device 1605 may support techniques for improved communication reliability, improved user experience related to increased data throughput, more efficient utilization of communication resources, improved coordination between devices, increased data throughput, and improved SRS sounding of frequency resources.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for partial frequency sounding with frequency hopping as described herein, or the processor 1640 and the memory 1630 may be otherwise configured to perform or support such operations.

Figure 17:
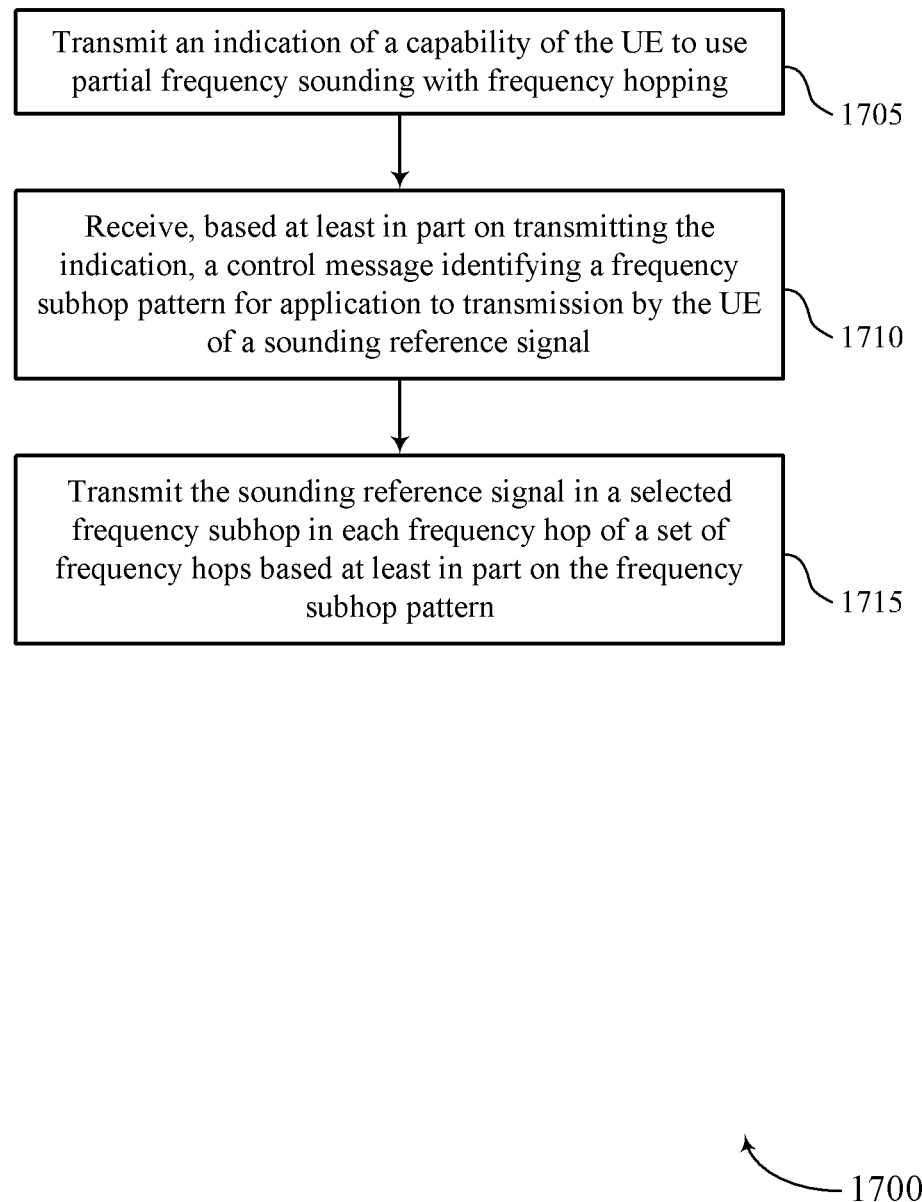
FIGS. 17 through 20 show flowcharts illustrating methods that support techniques for partial frequency sounding with frequency hopping in accordance with aspects of the present disclosure.

FIG. 17 shows a flowchart illustrating a method 1700 that supports techniques for partial frequency sounding with frequency hopping in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include transmitting an indication of a capability of the UE to use partial frequency sounding with frequency hopping. The operations of 1705 may be performed in accordance with examples as disclosed herein. In some examples, aspects of the operations of 1705 may be performed by a capability indication transmitting component 1125 as described with reference to FIG. 11.

At 1710, the method may include receiving, based on transmitting the indication, a control message identifying a frequency subhop pattern for application to transmission by the UE of an SRS. The operations of 1710 may be performed in accordance with examples as disclosed herein. In some examples, aspects of the operations of 1710 may be performed by a control message receiving component 1130 as described with reference to FIG. 11.

At 1715, the method may include transmitting the SRS in a selected frequency subhop in each frequency hop of a set of frequency hops based on the frequency subhop pattern. The operations of 1715 may be performed in accordance with examples as disclosed herein. In some examples, aspects of the operations of 1715 may be performed by an SRS transmitting component 1135 as described with reference to FIG. 11.

Figure 18:
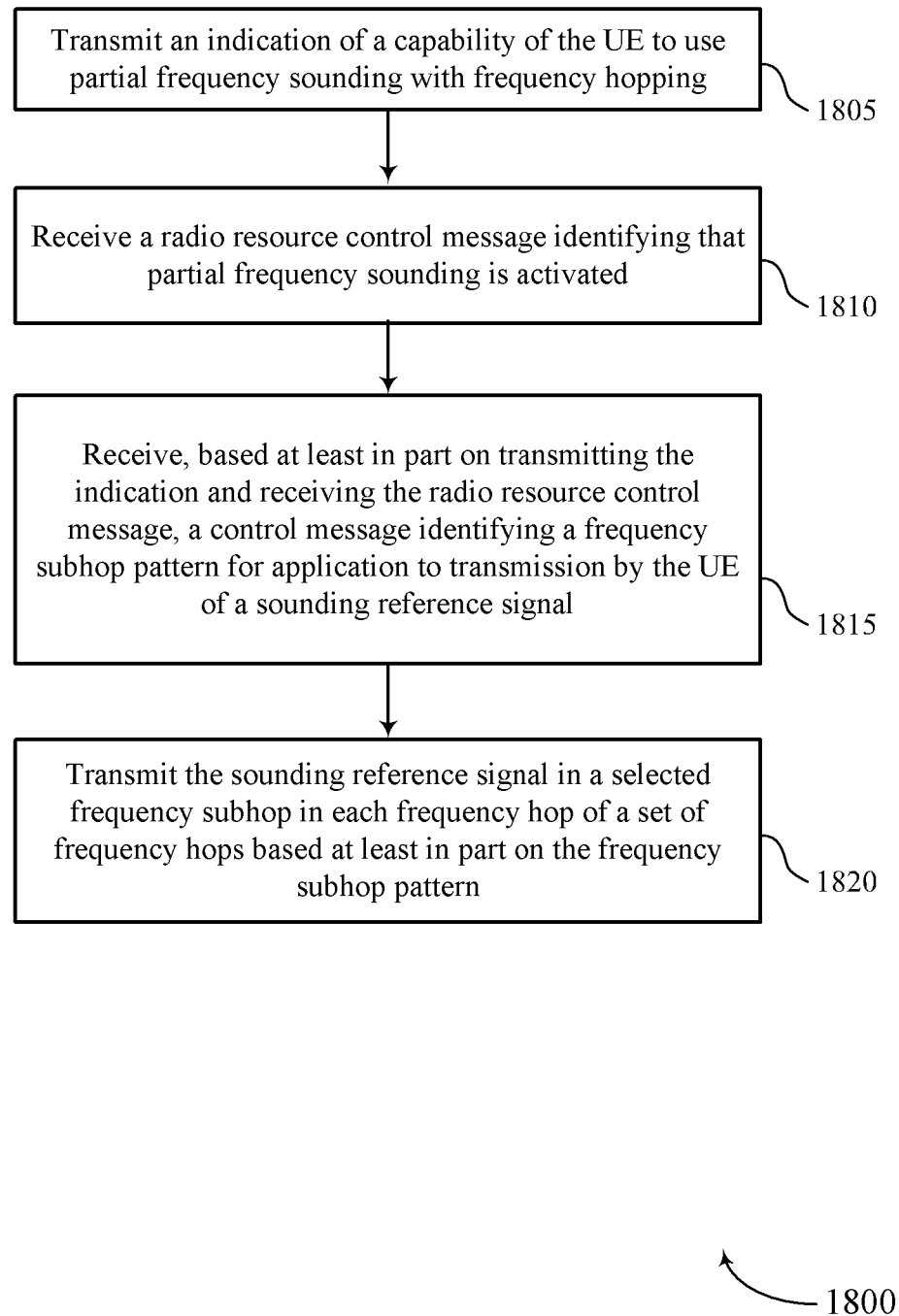

FIG. 18 shows a flowchart illustrating a method 1800 that supports techniques for partial frequency sounding with frequency hopping in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include transmitting an indication of a capability of the UE to use partial frequency sounding with frequency hopping. The operations of 1805 may be performed in accordance with examples as disclosed herein. In some examples, aspects of the operations of 1805 may be performed by a capability indication transmitting component 1125 as described with reference to FIG. 11.

At 1810, the method may include receiving an RRC message identifying that partial frequency sounding is activated. The operations of 1810 may be performed in accordance with examples as disclosed herein. In some examples, aspects of the operations of 1810 may be performed by an RRC receiving component 1140 as described with reference to FIG. 11.

At 1815, the method may include receiving, based on transmitting the indication and receiving the RRC message, a control message identifying a frequency subhop pattern for application to transmission by the UE of an SRS. The operations of 1815 may be performed in accordance with examples as disclosed herein. In some examples, aspects of the operations of 1815 may be performed by a control message receiving component 1130 as described with reference to FIG. 11.

At 1820, the method may include transmitting the SRS in a selected frequency subhop in each frequency hop of a set of frequency hops based on the frequency subhop pattern. The operations of 1820 may be performed in accordance with examples as disclosed herein. In some examples, aspects of the operations of 1820 may be performed by an SRS transmitting component 1135 as described with reference to FIG. 11.

Figure 19:
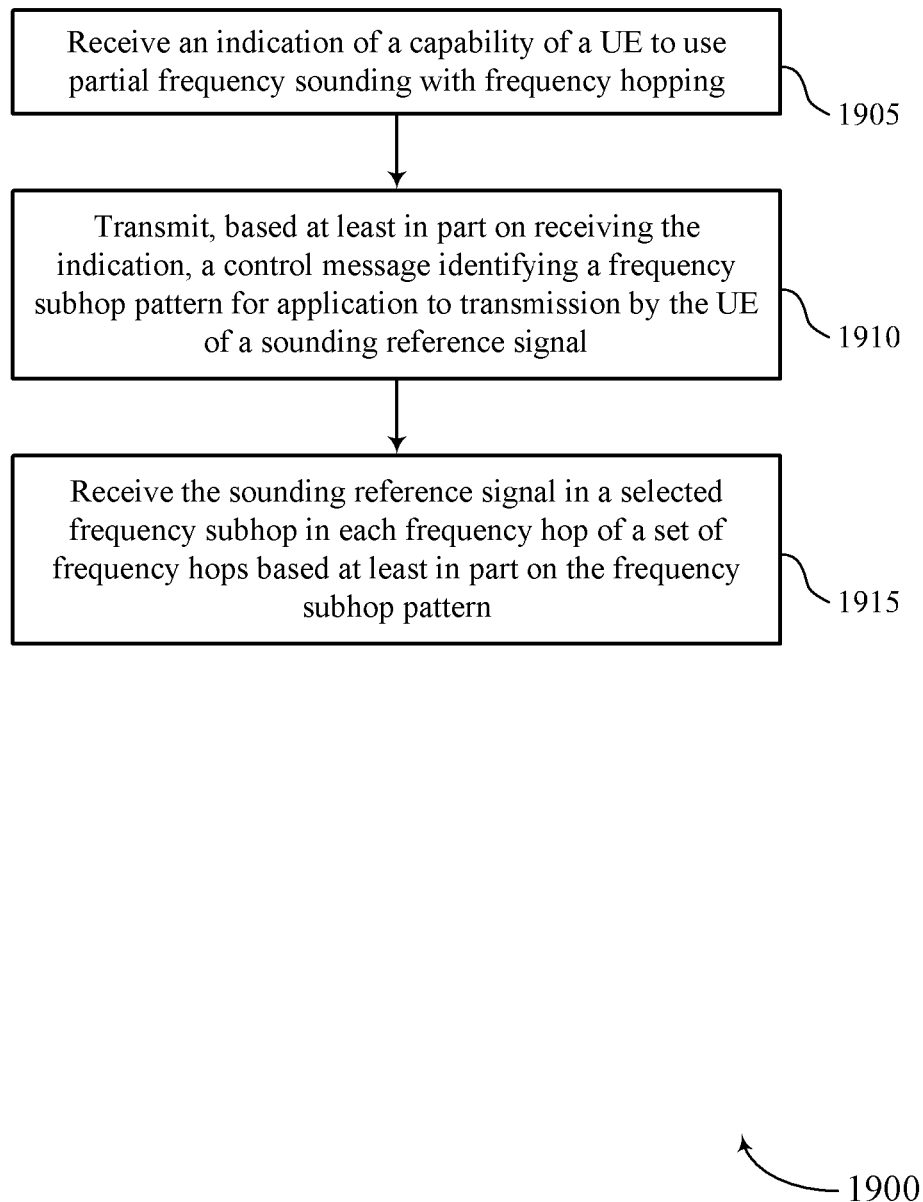

FIG. 19 shows a flowchart illustrating a method 1900 that supports techniques for partial frequency sounding with frequency hopping in accordance with aspects of the present disclosure. The operations of the method 1900 may be implemented by a network entity or its components as described herein. For example, the operations of the method 1900 may be performed by a network entity 105 as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include receiving an indication of a capability of a UE to use partial frequency sounding with frequency hopping. The operations of 1905 may be performed in accordance with examples as disclosed herein. In some examples, aspects of the operations of 1905 may be performed by a capability indication receiving component 1525 as described with reference to FIG. 15.

At 1910, the method may include transmitting, based on receiving the indication, a control message identifying a frequency subhop pattern for application to transmission by the UE of an SRS. The operations of 1910 may be performed in accordance with examples as disclosed herein. In some examples, aspects of the operations of 1910 may be performed by a control message transmitting component 1530 as described with reference to FIG. 15.

At 1915, the method may include receiving the SRS in a selected frequency subhop in each frequency hop of a set of frequency hops based on the frequency subhop pattern. The operations of 1915 may be performed in accordance with examples as disclosed herein. In some examples, aspects of the operations of 1915 may be performed by an SRS receiving component 1535 as described with reference to FIG. 15.

Figure 20:
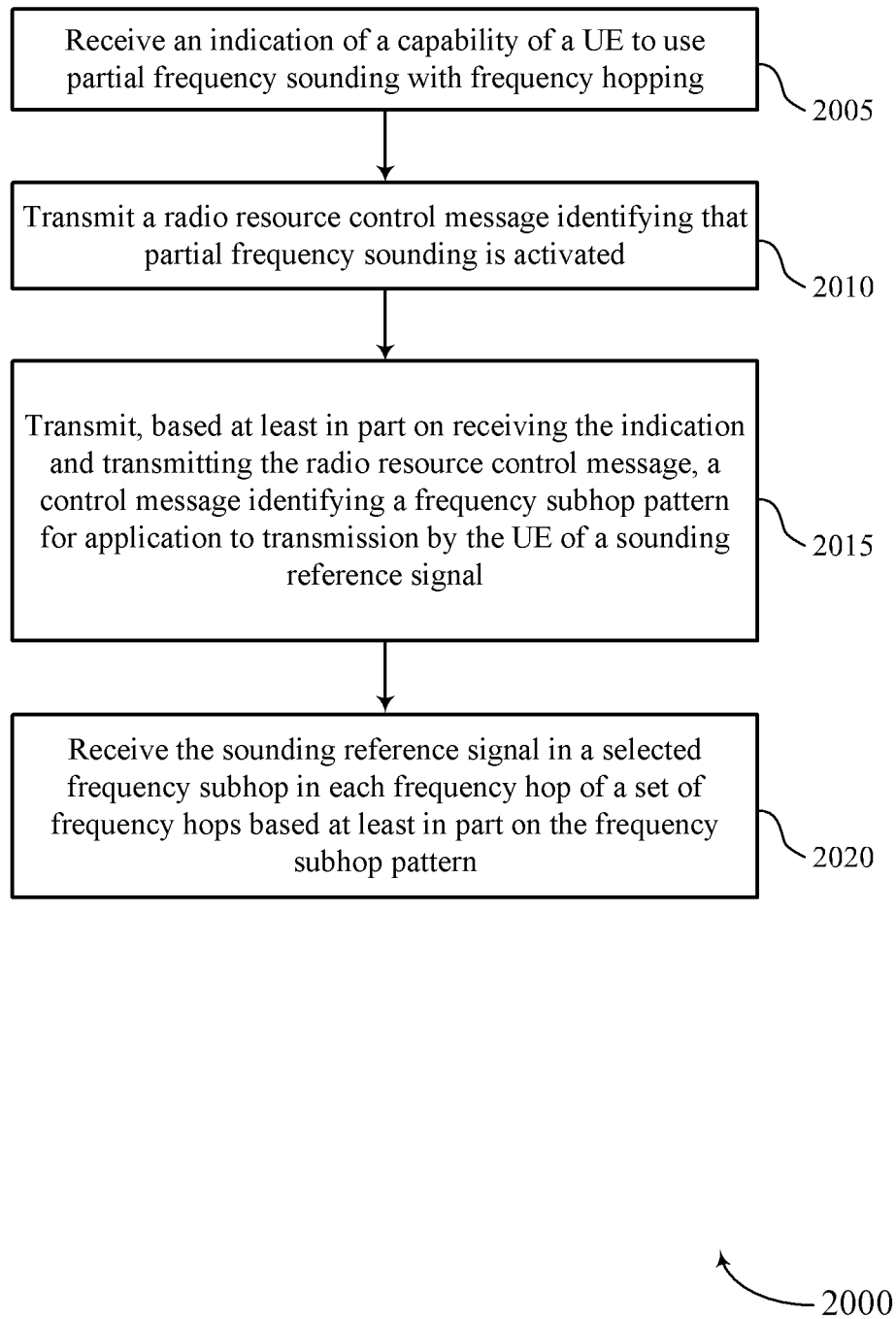

FIG. 20 shows a flowchart illustrating a method 2000 that supports techniques for partial frequency sounding with frequency hopping in accordance with aspects of the present disclosure. The operations of the method 2000 may be implemented by a network entity or its components as described herein. For example, the operations of the method 2000 may be performed by a network entity 105 as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include receiving an indication of a capability of a UE to use partial frequency sounding with frequency hopping. The operations of 2005 may be performed in accordance with examples as disclosed herein. In some examples, aspects of the operations of 2005 may be performed by a capability indication receiving component 1525 as described with reference to FIG. 15.

At 2010, the method may include transmitting an RRC message identifying that partial frequency sounding is activated. The operations of 2010 may be performed in accordance with examples as disclosed herein. In some examples, aspects of the operations of 2010 may be performed by an RRC transmitting component 1540 as described with reference to FIG. 15.

At 2015, the method may include transmitting, based on receiving the indication and transmitting the RRC message, a control message identifying a frequency subhop pattern for application to transmission by the UE of an SRS. The operations of 2015 may be performed in accordance with examples as disclosed herein. In some examples, aspects of the operations of 2015 may be performed by a control message transmitting component 1530 as described with reference to FIG. 15.

At 2020, the method may include receiving the SRS in a selected frequency subhop in each frequency hop of a set of frequency hops based on the frequency subhop pattern. The operations of 2020 may be performed in accordance with examples as disclosed herein. In some examples, aspects of the operations of 2020 may be performed by an SRS receiving component 1535 as described with reference to FIG. 15.

The following provides an overview of aspects of the present disclosure:

Aspect 1: A method for wireless communication at a UE, comprising: transmitting an indication of a capability of the UE to use partial frequency sounding with frequency hopping; receiving, based at least in part on transmitting the indication, a control message identifying a frequency subhop pattern for application to transmission by the UE of an SRS; and transmitting the SRS in a selected frequency subhop in each frequency hop of a set of frequency hops based at least in part on the frequency subhop pattern.

Aspect 2: The method of aspect 1, further comprising: receiving an RRC message identifying that partial frequency sounding is activated, wherein the control message identifying the frequency subhop pattern is received based at least in part on receiving the RRC message.

Aspect 3: The method of aspect 2, wherein the RRC message identifies one or more frequency subhop patterns, the one or more frequency subhop patterns comprising the frequency subhop pattern identified in the control message.

Aspect 4: The method of any of aspects 2 through 3, wherein the RRC message further identifies a scheduling configuration for the SRS, and the frequency subhop pattern identified in the control message is based at least in part on the identified scheduling configuration.

Aspect 5: The method of aspect 4, wherein the identified scheduling configuration comprises an aperiodic configuration, a semi-persistent configuration, or a periodic configuration.

Aspect 6: The method of any of aspects 1 through 5, wherein the control message identifies a starting subhop index for the frequency subhop pattern.

Aspect 7: The method of any of aspects 1 through 6, wherein receiving the control message identifying the frequency subhop pattern comprises: receiving a MAC-CE identifying the frequency subhop pattern and that partial frequency sounding is activated, wherein the MAC-CE comprises the control message.

Aspect 8: The method of aspect 7, wherein a first bit of the MAC-CE identifies that partial frequency sounding is activated, and a second bit the MAC-CE identifies the frequency subhop pattern.

Aspect 9: The method of any of aspects 7 through 8, wherein a set of bits of the message in the MAC-CE identifies the frequency subhop pattern and that partial frequency sounding is activated.

Aspect 10: The method of any of aspects 1 through 9, wherein receiving the control message identifying the frequency subhop pattern comprises: receiving a DCI message identifying the frequency subhop pattern and that partial frequency sounding is activated, wherein the DCI message comprises the control message.

Aspect 11: The method of any of aspects 1 through 10, wherein transmitting the SRS in the selected frequency subhop in each frequency hop further comprises: transmitting the SRS using a first same frequency subhop in each frequency hop within a first slot and a second same frequency subhop in each frequency hop within a second slot, the first same frequency subhop and the second same frequency subhop corresponding to the selected frequency subhop.

Aspect 12: The method of any of aspects 1 through 11, wherein transmitting the SRS in the selected frequency subhop in each frequency hop further comprises: transmitting the SRS using a same frequency subhop in each frequency hop, the same frequency subhop corresponding to the selected frequency subhop.

Aspect 13: The method of any of aspects 1 through 12, wherein transmitting the SRS in the selected frequency subhop in each frequency hop further comprises: transmitting the SRS using a first cyclic frequency subhop in each frequency hop within a first slot or a first symbol and a second cyclic frequency subhop in each frequency hop within a second slot or a second symbol, the first cyclic frequency subhop and the second cyclic frequency subhop corresponding to the selected frequency subhop.

Aspect 14: The method of any of aspects 1 through 13, wherein transmitting the SRS in the selected frequency subhop in each frequency hop further comprises: transmitting the SRS using a first frequency subhop in a first frequency hop and a second frequency subhop in a second frequency hop, the first frequency subhop and the second frequency subhop corresponding to the selected frequency subhop, wherein the first frequency subhop and the second frequency subhop are determined in accordance with a bit-reversal representation based at least in part on a first quantity of frequency subhops across a second quantity of frequency hops.

Aspect 15: The method of any of aspects 1 through 14, wherein transmitting the SRS in the selected frequency subhop in each frequency hop further comprises: transmitting the SRS using a first frequency subhop with a value zero in a first frequency hop and a second frequency subhop with a value two in a second frequency hop, the first frequency subhop and the second frequency subhop corresponding to the selected frequency subhop, wherein the first frequency subhop and the second frequency subhop are determined in accordance with a bit-reversal representation based at least in part on each of the first frequency hop and the second frequency hop comprising four frequency subhops.

Aspect 16: The method of any of aspects 1 through 15, wherein transmitting the SRS in the selected frequency subhop in each frequency hop further comprises: transmitting the SRS using a first frequency subhop in a first frequency hop and a second frequency subhop in a second frequency hop, the first frequency subhop and the second frequency subhop corresponding to the selected frequency subhop, wherein the first frequency subhop and the second frequency subhop are determined in accordance with a function that is based at least in part on a symbol count and a partial frequency sounding configuration.

Aspect 17: The method of any of aspects 1 through 16, wherein transmitting the SRS in the selected frequency subhop in each frequency hop further comprises: transmitting the SRS using a first frequency subhop for a first frequency hop and a second frequency subhop for a second frequency hop, the first frequency subhop and the second frequency subhop corresponding to the selected frequency subhop, wherein the first frequency subhop and the second frequency subhop are determined in accordance with a randomization procedure that is based at least in part on an identifier associated with the UE and a partial frequency sounding configuration.

Aspect 18: The method of any of aspects 1 through 17, wherein transmitting the SRS in the selected frequency subhop in each frequency hop further comprises: transmitting the SRS using a frequency subhop in a frequency hop, the frequency subhop corresponding to the selected frequency subhop, wherein the frequency subhop is determined in accordance with a repetition of the frequency subhop pattern.

Aspect 19: The method of any of aspects 1 through 18, wherein transmitting the SRS in the selected frequency subhop in each frequency hop further comprises: transmitting the SRS using a same frequency subhop in a first frequency hop and a second frequency hop, the same frequency subhop corresponding to the selected frequency subhop, wherein the same frequency subhop is determined in accordance with a configured repetition factor.

Aspect 20: The method of any of aspects 1 through 19, wherein transmitting the SRS in the selected frequency subhop in each frequency hop further comprises: transmitting the SRS using a first frequency subhop in a first frequency hop and a second frequency subhop in a second frequency hop, the first frequency subhop and the second frequency subhop corresponding to the selected frequency subhop, wherein the first frequency subhop and the second frequency subhop are determined in accordance with a configured repetition factor.

Aspect 21: The method of any of aspects 1 through 20, further comprising: receiving a configuration message identifying a frequency overlap configuration associated with frequency subhops in each frequency hop of the set of frequency hops, wherein transmitting the SRS in the selected frequency subhop is further based at least in part on the frequency overlap configuration.

Aspect 22: A method for wireless communication at a network entity, comprising: receiving an indication of a capability of a UE to use partial frequency sounding with frequency hopping; transmitting, based at least in part on receiving the indication, a control message identifying a frequency subhop pattern for application to transmission by the UE of an SRS; and receiving the SRS in a selected frequency subhop in each frequency hop of a set of frequency hops based at least in part on the frequency subhop pattern.

Aspect 23: The method of aspect 22, further comprising: transmitting an RRC message identifying that partial frequency sounding is activated, wherein the control message identifying the frequency subhop pattern is transmitted based at least in part on transmitting the RRC message.

Aspect 24: The method of aspect 23, wherein the RRC message identifies one or more frequency subhop patterns, the one or more frequency subhop patterns comprising the frequency subhop pattern identified in the control message.

Aspect 25: The method of any of aspects 23 through 24, wherein the RRC message further identifies a scheduling configuration for the SRS, and the frequency subhop pattern identified in the control message is based at least in part on the identified scheduling configuration.

Aspect 26: The method of aspect 25, wherein the identified scheduling configuration comprises an aperiodic configuration, a semi-persistent configuration, or a periodic configuration.

Aspect 27: The method of any of aspects 22 through 26, wherein the control message identifies a starting subhop index for the frequency subhop pattern.

Aspect 28: The method of any of aspects 22 through 27, wherein transmitting the control message identifying the frequency subhop pattern comprises: transmitting a MAC-CE identifying the frequency subhop pattern and that partial frequency sounding is activated, wherein the MAC-CE comprises the control message.

Aspect 29: The method of aspect 28, wherein a first bit of the MAC-CE identifies that partial frequency sounding is activated, and a second bit MAC-CE identifies the frequency subhop pattern.

Aspect 30: The method of any of aspects 28 through 29, wherein a set of bits of the message in the MAC-CE identifies the frequency subhop pattern and that partial frequency sounding is activated.

Aspect 31: The method of any of aspects 22 through 30, wherein transmitting the control message identifying the frequency subhop pattern comprises: transmitting a DCI message identifying the frequency subhop pattern and that partial frequency sounding is activated, wherein the DCI message comprises the control message.

Aspect 32: An apparatus for wireless communication at a UE, comprising a processor; memory coupled with the processor; and instructions stored in the memory and executable by the processor to cause the apparatus to perform a method of any of aspects 1 through 21.

Aspect 33: An apparatus for wireless communication at a UE, comprising at least one means for performing a method of any of aspects 1 through 21.

Aspect 34: A non-transitory computer-readable medium storing code for wireless communication at a UE, the code comprising instructions executable by a processor to perform a method of any of aspects 1 through 21.

Aspect 35: An apparatus for wireless communication at a network entity, comprising a processor; memory coupled with the processor; and instructions stored in the memory and executable by the processor to cause the apparatus to perform a method of any of aspects 22 through 31.

Aspect 36: An apparatus for wireless communication at a network entity, comprising at least one means for performing a method of any of aspects 22 through 31.

Aspect 37: A non-transitory computer-readable medium storing code for wireless communication at a network entity, the code comprising instructions executable by a processor to perform a method of any of aspects 22 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting an indication of a capability of the UE to use partial frequency sounding with frequency hopping;
   receiving, based at least in part on transmitting the indication, a control message identifying a frequency subhop pattern for application to transmission by the UE of a sounding reference signal; and
   transmitting the sounding reference signal in a selected frequency subhop in each frequency hop of a set of frequency hops based at least in part on the frequency subhop pattern.

2. The method of claim 1, further comprising:
   receiving a radio resource control message identifying that partial frequency sounding is activated, wherein the control message identifying the frequency subhop pattern is received based at least in part on receiving the radio resource control message.

3. The method of claim 2, wherein the radio resource control message identifies one or more frequency subhop patterns, the one or more frequency subhop patterns comprising the frequency subhop pattern identified in the control message.

4. The method of claim 2, wherein:
   the radio resource control message further identifies a scheduling configuration for the sounding reference signal, and
   the frequency subhop pattern identified in the control message is based at least in part on the identified scheduling configuration.

5. The method of claim 4, wherein the identified scheduling configuration comprises an aperiodic configuration, a semi-persistent configuration, or a periodic configuration.

6. The method of claim 1, wherein the control message identifies a starting subhop index for the frequency subhop pattern.

7. The method of claim 1, wherein transmitting the sounding reference signal in the selected frequency subhop in each frequency hop further comprises:
   transmitting the sounding reference signal using a first same frequency subhop in each frequency hop within a first slot and a second same frequency subhop in each frequency hop within a second slot, the first same frequency subhop and the second same frequency subhop corresponding to the selected frequency subhop.

8. The method of claim 1, wherein transmitting the sounding reference signal in the selected frequency subhop in each frequency hop further comprises:
   transmitting the sounding reference signal using a same frequency subhop in each frequency hop, the same frequency subhop corresponding to the selected frequency subhop.

9. The method of claim 1, wherein transmitting the sounding reference signal in the selected frequency subhop in each frequency hop further comprises:
   transmitting the sounding reference signal using a first cyclic frequency subhop in each frequency hop within a first slot or a first symbol and a second cyclic frequency subhop in each frequency hop within a second slot or a second symbol, the first cyclic frequency subhop and the second cyclic frequency subhop corresponding to the selected frequency subhop.

10. The method of claim 1, wherein transmitting the sounding reference signal in the selected frequency subhop in each frequency hop further comprises:
    transmitting the sounding reference signal using a first frequency subhop in a first frequency hop and a second frequency subhop in a second frequency hop, the first frequency subhop and the second frequency subhop corresponding to the selected frequency subhop, wherein the first frequency subhop and the second frequency subhop are determined in accordance with a bit-reversal representation based at least in part on a first quantity of frequency subhops across a second quantity of frequency hops.

11. The method of claim 1, wherein transmitting the sounding reference signal in the selected frequency subhop in each frequency hop further comprises:
    transmitting the sounding reference signal using a first frequency subhop with a value zero in a first frequency hop and a second frequency subhop with a value two in a second frequency hop, the first frequency subhop and the second frequency subhop corresponding to the selected frequency subhop, wherein the first frequency subhop and the second frequency subhop are determined in accordance with a bit-reversal representation based at least in part on each of the first frequency hop and the second frequency hop comprising four frequency subhops.

12. The method of claim 1, wherein transmitting the sounding reference signal in the selected frequency subhop in each frequency hop further comprises:
transmitting the sounding reference signal using a first frequency subhop in a first frequency hop and a second frequency subhop in a second frequency hop, the first frequency subhop and the second frequency subhop corresponding to the selected frequency subhop, wherein the first frequency subhop and the second frequency subhop are determined in accordance with a function that is based at least in part on a symbol count and a partial frequency sounding configuration.

13. The method of claim 1, wherein transmitting the sounding reference signal in the selected frequency subhop in each frequency hop further comprises:
transmitting the sounding reference signal using a first frequency subhop for a first frequency hop and a second frequency subhop for a second frequency hop, the first frequency subhop and the second frequency subhop corresponding to the selected frequency subhop, wherein the first frequency subhop and the second frequency subhop are determined in accordance with a randomization procedure that is based at least in part on an identifier associated with the UE and a partial frequency sounding configuration.

14. The method of claim 1, wherein transmitting the sounding reference signal in the selected frequency subhop in each frequency hop further comprises:
transmitting the sounding reference signal using a frequency subhop in a frequency hop, the frequency subhop corresponding to the selected frequency subhop, wherein the frequency subhop is determined in accordance with a repetition of the frequency subhop pattern.

15. The method of claim 1, wherein transmitting the sounding reference signal in the selected frequency subhop in each frequency hop further comprises:
transmitting the sounding reference signal using a same frequency subhop in a first frequency hop and a second frequency hop, the same frequency subhop corresponding to the selected frequency subhop, wherein the same frequency subhop is determined in accordance with a configured repetition factor.

16. The method of claim 1, wherein transmitting the sounding reference signal in the selected frequency subhop in each frequency hop further comprises:
transmitting the sounding reference signal using a first frequency subhop in a first frequency hop and a second frequency subhop in a second frequency hop, the first frequency subhop and the second frequency subhop corresponding to the selected frequency subhop, wherein the first frequency subhop and the second frequency subhop are determined in accordance with a configured repetition factor.

17. The method of claim 1, further comprising:
receiving a configuration message identifying a frequency overlap configuration associated with frequency subhops in each frequency hop of the set of frequency hops, wherein transmitting the sounding reference signal in the selected frequency subhop is further based at least in part on the frequency overlap configuration.

18. A method for wireless communication at a network entity, comprising:
receiving an indication of a capability of a user equipment (UE) to use partial frequency sounding with frequency hopping;
transmitting, based at least in part on receiving the indication, a control message identifying a frequency subhop pattern for application to transmission by the UE of a sounding reference signal; and
receiving the sounding reference signal in a selected frequency subhop in each frequency hop of a set of frequency hops based at least in part on the frequency subhop pattern.

19. The method of claim 18, further comprising:
transmitting a radio resource control message identifying that partial frequency sounding is activated, wherein the control message identifying the frequency subhop pattern is transmitted based at least in part on transmitting the radio resource control message.

20. The method of claim 19, wherein the radio resource control message identifies one or more frequency subhop patterns, the one or more frequency subhop patterns comprising the frequency subhop pattern identified in the control message.

21. The method of claim 19, wherein:
the radio resource control message further identifies a scheduling configuration for the sounding reference signal, and
the frequency subhop pattern identified in the control message is based at least in part on the identified scheduling configuration.

22. The method of claim 21, wherein the identified scheduling configuration comprises an aperiodic configuration, a semi-persistent configuration, or a periodic configuration.

23. The method of claim 18, wherein the control message identifies a starting subhop index for the frequency subhop pattern.

24. An apparatus for wireless communication at a user equipment (UE), comprising:
a processor;
memory coupled with the processor; and
instructions stored in the memory and executable by the processor to cause the apparatus to:
transmit an indication of a capability of the UE to use partial frequency sounding with frequency hopping;
receive, based at least in part on transmitting the indication, a control message identifying a frequency subhop pattern for application to transmission by the UE of a sounding reference signal; and
transmit the sounding reference signal in a selected frequency subhop in each frequency hop of a set of frequency hops based at least in part on the frequency subhop pattern.

25. The apparatus of claim 24, wherein the instructions are further executable by the processor to cause the apparatus to:
receive a radio resource control message identifying that partial frequency sounding is activated, wherein the control message identifying the frequency subhop pattern is received based at least in part on receiving the radio resource control message.

26. The apparatus of claim 25, wherein the radio resource control message identifies one or more frequency subhop patterns, the one or more frequency subhop patterns comprising the frequency subhop pattern identified in the control message.

27. The apparatus of claim 25, wherein:
the radio resource control message further identifies a scheduling configuration for the sounding reference signal, and
the frequency subhop pattern identified in the control message is based at least in part on the identified scheduling configuration.

28. An apparatus for wireless communication at a network entity, comprising:
a processor;
memory coupled with the processor; and
instructions stored in the memory and executable by the processor to cause the apparatus to:
receive an indication of a capability of a user equipment (UE) to use partial frequency sounding with frequency hopping;
transmit, based at least in part on receiving the indication, a control message identifying a frequency subhop pattern for application to transmission by the UE of a sounding reference signal; and
receive the sounding reference signal in a selected frequency subhop in each frequency hop of a set of frequency hops based at least in part on the frequency subhop pattern.

29. The apparatus of claim 28, wherein the instructions are further executable by the processor to cause the apparatus to:
transmit a radio resource control message identifying that partial frequency sounding is activated, wherein the control message identifying the frequency subhop pattern is transmitted based at least in part on transmitting the radio resource control message.

30. The apparatus of claim 29, wherein the radio resource control message identifies one or more frequency subhop patterns, the one or more frequency subhop patterns comprising the frequency subhop pattern identified in the control message.

* * * * *